(12) United States Patent
Han et al.

(10) Patent No.: US 11,876,465 B2
(45) Date of Patent: Jan. 16, 2024

(54) HOME APPLIANCE AND CONTROLLING METHOD FOR THE SAME

(71) Applicant: LG Electronics Inc., Seoul (KR)

(72) Inventors: In Woo Han, Seoul (KR); Sun Cheol Bae, Seoul (KR); Jung Hun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 58 days.

(21) Appl. No.: 17/550,850

(22) Filed: Dec. 14, 2021

(65) Prior Publication Data

US 2022/0190763 A1 Jun. 16, 2022

(30) Foreign Application Priority Data

Dec. 14, 2020 (KR) .................. 10-2020-0174819

(51) Int. Cl.
| | |
|---|---|
| *H02P 6/24* | (2006.01) |
| *H02P 23/14* | (2006.01) |
| *D06F 33/48* | (2020.01) |
| *D06F 34/14* | (2020.01) |
| *D06F 34/08* | (2020.01) |
| *D06F 37/30* | (2020.01) |
| *H02P 27/06* | (2006.01) |

(52) U.S. Cl.
CPC .............. *H02P 23/14* (2013.01); *D06F 33/48* (2020.02); *D06F 34/08* (2020.02); *D06F 34/14* (2020.02); *D06F 37/304* (2013.01); *H02P 27/06* (2013.01)

(58) Field of Classification Search
CPC ........... H02P 23/14; H02P 27/06; D06F 33/48
See application file for complete search history.

(56) References Cited

U.S. PATENT DOCUMENTS

| 2005/0102765 | A1 | 5/2005 | Jeong et al. | |
| 2008/0066238 | A1* | 3/2008 | Lee .......... | D06F 34/16 |
| | | | | 68/12.02 |
| 2017/0047876 | A1* | 2/2017 | Lee .......... | H02P 27/06 |
| 2017/0054394 | A1* | 2/2017 | Jung .......... | H02P 27/06 |
| 2019/0382936 | A1* | 12/2019 | Choung .......... | D06F 33/48 |

FOREIGN PATENT DOCUMENTS

| JP | H07323193 | 12/1995 |
| JP | 2008000503 | 1/2008 |
| JP | 2011176922 | 9/2011 |
| KR | 19980009603 | 4/1998 |
| KR | 20160102831 | 8/2016 |

OTHER PUBLICATIONS

Office Action in Korean Appln. No. 10-2020-0174819, dated Feb. 14, 2022, 13 pages (with English translation).
Extended European Search Report in European Appln. No. 21213976.0, dated May 9, 2022, 9 pages.

* cited by examiner

*Primary Examiner* — Muhammad S Islam
(74) *Attorney, Agent, or Firm* — Fish & Richardson P.C.

(57) ABSTRACT

A motor driving apparatus includes: an inverter that includes at least one switching element and that is configured to output alternating current power to a motor, a vibration sensor configured to detect vibrations, and a controller (i) comprising a compensation signal generator that is configured to, based on an output value of the vibration sensor, generate a compensation signal and (ii) configured to generate a control signal for controlling the inverter.

18 Claims, 23 Drawing Sheets

HOME APPLIANCE AND CONTROLLING METHOD FOR THE SAME

CROSS-REFERENCE TO RELATED APPLICATION

This application claims the benefit of Korean Patent Application No. 10-2020-0174819, filed on Dec. 14, 2020, in the Korean Intellectual Property Office, the present disclosure of which is incorporated herein in its entirety by reference.

BACKGROUND

1. Field

The present disclosure relates to a home appliance and a control method thereof. One particular implementation relates to a control method to reduce vibrations in a home appliance equipped with a motor and an apparatus using the same.

2. Description of the Related Art

Most home appliances include motors. At least some of constituent elements of the home appliance rotate with the drive of the motors. A representative example of such a home appliance may be a washing machine.

In general, the washing machine is an apparatus for processing laundry through various actions such as washing, dehydrating and/or drying. The washing machine includes an outer tub in which water is stored, and an inner tub that is rotatably provided inside the outer tub and having a large number of through-holes formed therein to pass water therethrough.

The washing machine may be classified into a top load type of washing machine in which laundry (or cloths) is introduced from the above and the inner tub is rotated about a vertical axis, and a front load type of washing machine in which laundry is introduced from the front side and the inner tub (or drum) is rotated about a horizontal axis.

In a state in which laundry such as cloths, bedding or the like are put into the inner tub, when a user selects a desired course using a control panel, the washing machine executes a preset algorithm corresponding to the selected course so as to perform processes such as water feeding/draining, washing, rinsing, dehydrating, and the like.

The operation of the washing machine may typically be divided into a washing process, a rinsing process, and a dehydrating process. The progress of such processes may be monitored through a display provided in the control panel.

In the washing process, detergent is supplied into the inner tub together with water to remove contaminants adhering to the laundry through chemical actions by the detergent and physical actions associated with rotation of a pulsator and/or the inner tub.

In the rinsing process, clean water without detergent is supplied into the inner tub to rinse the laundry. In particular, the rinsing process may remove the detergent absorbed in the laundry during the washing process. In the rinsing process, a fabric softener may be supplied into the inner tub together with water.

In the dehydrating process following the rinsing process, the inner tub is rotated at high speed to dehydrate the laundry. Typically, upon completing the dehydrating process, the entire operation of the washing machine may be terminated. On the other hand, for a washing machine with a drying function, a drying process may be further performed after the dehydrating process.

Incidentally, at the time of a high speed rotation as in the dehydrating process, the rotational central axis of the inner tub may be displaced (or decentered) from the center when laundry accommodated in the inner tub are rotating integrally with the inner tub, causing vibration in the cabinet of the washing machine. Such a vibration may cause not only noise but also a degradation in dehydration effect. In addition, the vibration in the cabinet of the washing machine may shorten the mechanical life of the washing machine. In order to reduce such a vibration, the washing machine may include a vibration reduction apparatus and may use a method of controlling the vibration reduction apparatus.

Patent Document: Korean Patent Application Publication No. 2016-0102831

The washing machine disclosed in Patent Document above includes a damping device provided between the outer tub and the inner tub to reduce vibration associated with the rotation of the inner tub, thus reducing the vibration of the washing machine. However, such a damping device reduces the vibration in a passive manner regardless of the rotational pattern of the inner tub. For this reason, the use of the damping device may not actively cope with other types of vibrations generated according to the amount of laundry accommodated in the inner tub or the rotational speed of the inner tub. Therefore, there is a limit in effectively controlling the vibration. In addition, in the washing machine disclosed in Patent Document above, the damping device is mechanically connected to the inner tub. This may cause a degradation in the manufacturing property of the washing machine. Further, the damping device may affect the durability of the washing machine. Therefore, a demand has existed for a method and apparatus which is capable of actively coping with vibration according to the operation environment of the washing machine and reducing vibration of the washing machine while minimizing the mechanical connection.

SUMMARY

An aspect provides a motor control method to reduce vibration in a home appliance equipped with a motor and a home appliance using the same.

Another aspect also provides a control method for generating a control signal for reducing vibration based on information acquired by a vibration sensor in a home appliance, and controlling a motor with the control signal, thereby reducing vibration without a large change in an instruction RPM, and a home appliance using the same.

According to an aspect, there is provided a motor driving apparatus including: an inverter including at least one switching element and configured to output an alternating power to a motor; a vibration sensor configured to detect vibration; and a controller configured to generate a control signal that controls the inverter and including a compensation signal component which is generated based on an output value of the vibration sensor.

According to another aspect, there is also provided a motor control method including: controlling an inverter to drive a motor; identifying an output value of a vibration sensor with the driving of the motor; and generating a control signal that includes a compensation signal component generated based on the output value of the vibration sensor and controls the inverter.

According to example embodiments, it is possible to generate a vibration reduction control signal based on information about vibration detected by a vibration sensor in a home appliance equipped with a motor, and controlling the motor with the control signal, thereby actively coping with the vibration.

According to example embodiments, it is possible to reduce vibration at the time of driving of the motor while minimizing additional mechanical configurations associated with the driving of the motor.

According to example embodiments, it is possible to reduce vibration with a vibration reduction control signal without a large change in a drive RPM of the motor, which is effective in reducing vibration while maintaining the existing operation pattern as much as possible.

BRIEF DESCRIPTION OF THE DRAWINGS

The above and other aspects, features, and advantages of certain embodiments will be more apparent from the following detailed description taken in conjunction with the accompanying drawings, in which.

DETAILED DESCRIPTION

Figure 1:
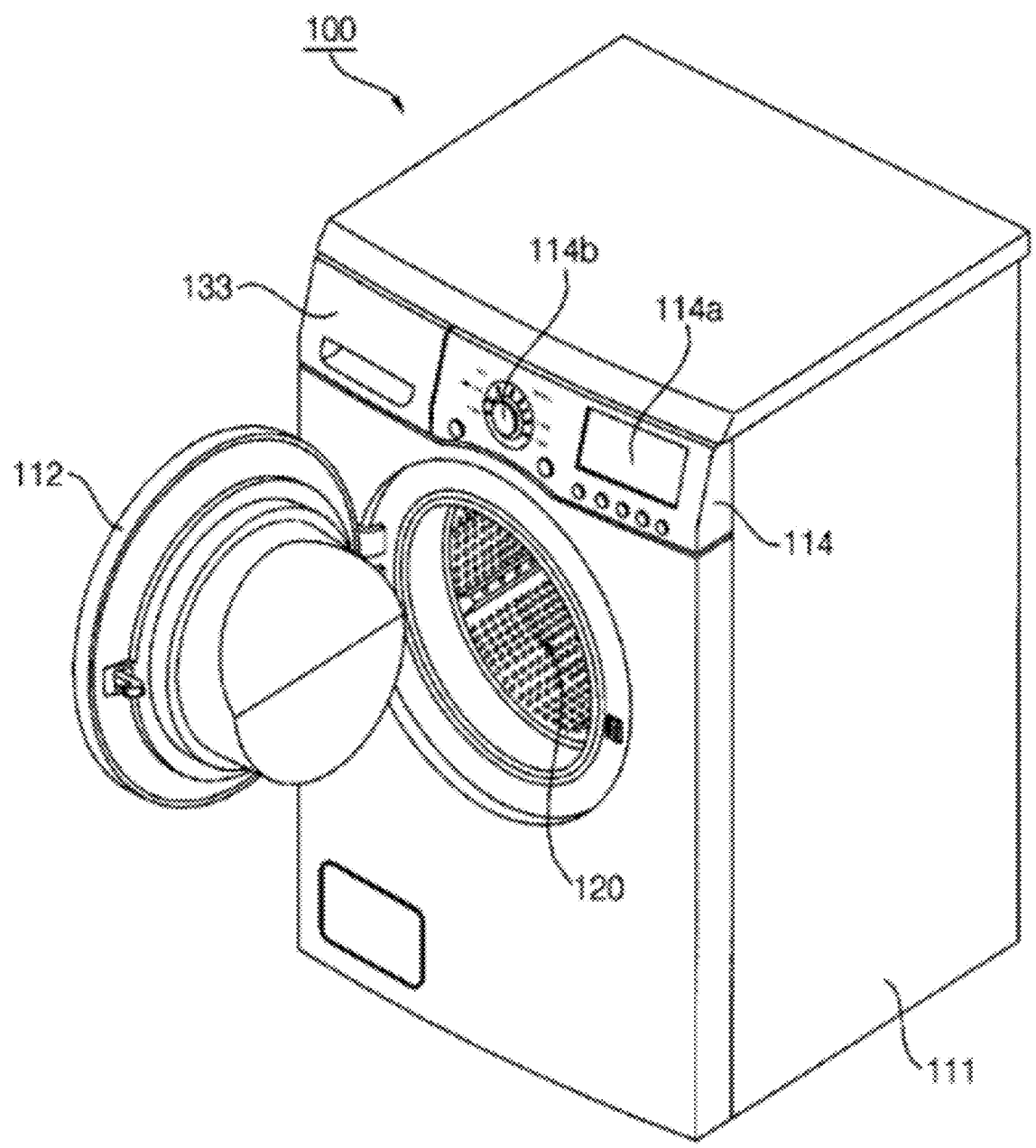
FIG. 1 is a perspective view illustrating a washing machine according to an example embodiment of the present disclosure.

Hereinafter, example embodiments of the present disclosure will be described in detail with reference to the drawings.

Technical contents that are well known in a technical field to which the present disclosure pertains and are not directly related to the present disclosure will be omitted in describing example embodiments. This is to more clearly describe the gist of the present disclosure by omitting unnecessary description.

Further, in the accompanying drawings, some of constituent elements are illustrated on a large scale, omitted, or schematically illustrated. In addition, the size of each constituent element does not fully reflect the actual size. In each drawing, the same or corresponding elements will be indicated by the same reference numeral.

Advantages and features of the present disclosure, and a method of achieving them, will become more apparent by example embodiments described below in detail in conjunction with the accompanying drawings. However, the present disclosure is not limited to example embodiments which will be described later, and may be implemented in various different forms. The present example embodiments merely completely describe the present disclosure, and are provided to faithfully explain the scope of the present disclosure to those skill in the art to which the present disclosure pertains. The present disclosure is merely defined by the scope of the claims. Throughout the specification, like reference numeral refer to like constituent elements.

Further, it will also be understood that each block in process flowchart figures and combinations of the process flowchart figures may be executed by computer program instructions. These computer program instructions may be incorporated in a processor of a general-purpose computer, a special-purpose computer, or other programmable data processing equipment. The instructions, when executed by the processor of such computers or other programmable data processing equipment, may implement parts for performing functions described in the block(s) in the flowchart figures. These computer program instructions may be stored in a computer-usable or computer-readable memory that may oriented to the computer or other programmable data processing equipment to implement functions in a particular manner. Thus, the instructions stored in the computer-usable or computer-readable memory may produce a manufacture article incorporating instruction parts for performing the functions described in the block(s) of the flowchart figures. The computer program instructions may be incorporated in the computer or other programmable data processing equipment so that a series of operations are performed on the computer or other programmable data processing equipment to implement processes executed by the computer. Thus, the instructions that operate the computer or other programmable data processing equipment may also provide operations of executing the functions described in the block(s) in the flowchart figures.

In addition, each block may represent a portion of a module, segment, or code that includes one or more executable instructions for executing assigned logical function(s). Further, it should also be noted that in some alternative implementations, the functions recited in the blocks may be executed in a non-sequence manner. For example, two successive blocks may be executed substantially in parallel or may be executed in the reverse order according to their functions.

In addition, the term "~part" used in this example embodiment may refer to software or a hardware constituent element such as a field-programmable gate array (FPGA) or an application specific integrated circuit (ASIC). The "~part" may perform a certain role. However, the "~part" is not limited to software or hardware. The "~part" may be configured to be included in an addressable storage medium, or configured to reproduce one or more processors. Thus, as an example, the "~part" may include constituent elements such as software constituent elements, object-oriented software constituent elements, class constituent elements and task constituent elements, processes, functions, properties, procedures, subroutines, segments of program codes, drivers, firmware, microcode, circuits, data, databases, data structures, tables, arrays, and variables. The functions provided by the constituent elements and the "~parts" may be combined with a smaller number of constituent elements and "~parts" or may further be divided into additional constituent elements and "~parts". Besides, the constituent elements and "~parts" may be implemented to play one or more CPUs in a device or security multimedia card.

Figure 2:
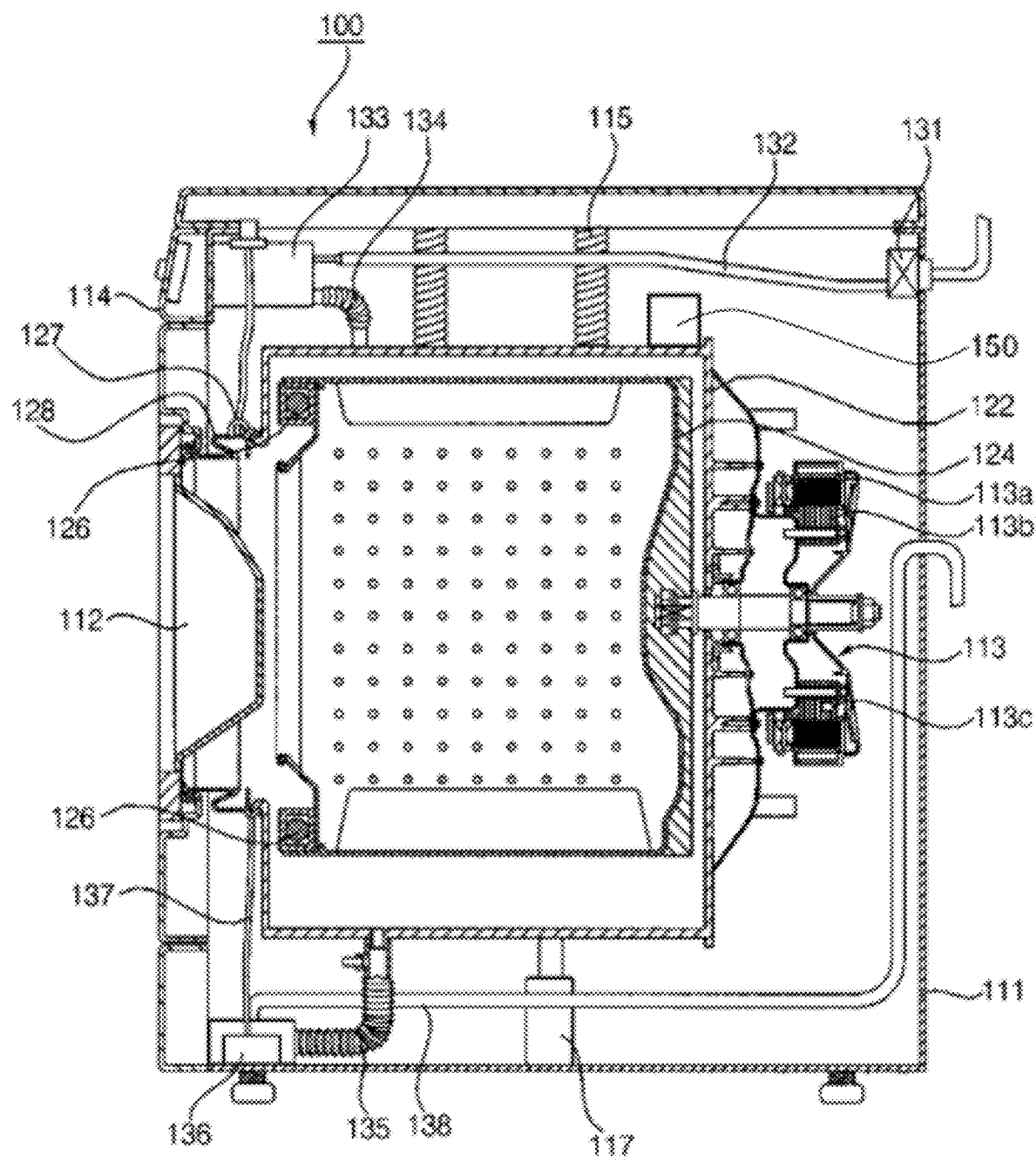
FIG. 2 is a cross-sectional view of the washing machine in FIG. 1.

FIG. 1 is a perspective view illustrating a washing machine according to an example embodiment of the present disclosure, and FIG. 2 is a cross-sectional view of the washing machine in FIG. 1.

Referring to FIGS. 1 and 2, a washing machine 100 according to an example embodiment of the present disclosure includes a cabinet 111 defining an appearance, a door 112 that opens and closes one side of the cabinet 111 to move cloths therethrough, a tub 122 disposed inside the cabinet 111 and supported by the cabinet 111, a drum 124 disposed inside the tub 122 and configured to rotate the cloths accommodated therein, a motor 113 that applies torque to the drum 124 to rotate the drum 124, a detergent box 133 in which detergents are accommodated, and a control panel 114 that indicates a state of the washing machine 100 according to an user's input.

The cabinet 111 includes a cloth outlet/inlet 120 through which the cloths pass. The door 112 is rotatably coupled to the cabinet 111 so as to be able to open and close the cloth outlet/inlet 120. The cabinet 111 includes a control panel 114. The detergent box 133 is provided to be pulled out from the cabinet 111.

The tub 122 is disposed inside the cabinet 111 such that it can be buffered by springs 115 and a damper 117. The tub 122 receives washing water. The drum 124 is disposed inside the tub 122.

The drum 124 rotates the cloths accommodated therein. The drum 124 has a plurality of through-holes formed to pass the laundry water therethrough. Lifters 125 may be provided on the inner wall of the drum 124 to lift up the cloths to a certain height when the drum 124 rotates. The drum 124 is rotated by virtue of a rotational force transmitted from the motor 113.

A balancer 126 is provided on the circumference of the drum 124 to adjust a center of gravity of the drum 124 when the cloths are decentered. When the drum 124 rotates with the cloths decentered, unbalance in which a geometric center of the rotation axis itself of the drum 124 and an actual center of gravity thereof do not coincide with each other, is generated, which causes vibration and noise. The balancer 126 reduces the unbalance of the drum 124 such that the actual center of gravity of the drum 124 approaches the rotational center.

The balancer 126 may be provided in at least one of the front and rear sides of the drum 124. In this example embodiment, the balancer 126 is provided in the front side of the drum 124. When the drum 124 rotates, the cloths accommodated in the drum 124 may be generally biased inward of the drum 124, that is, the rear side thereof. Thus, in order to keep balance with respect to the cloths biased to the rear side of the drum 124, the balancer 126 may be provided on the front side of the drum 124.

The balancer 126 includes an inner material having a predetermined weight therein such that the center of gravity variably moves, and is configured to have a path through which the inner material is moveable along the circumferential direction. The balancer 126 is distributed such that the inner material moves to the opposite side of the center of gravity of the cloths. Thus, the center of gravity of the drum 124 approaches the rotational center thereof.

An example of the balancer 126 may include a liquid balancer in which liquid having a predetermined weight is accommodated, or a ball balancer in which a ball having a predetermined weight is accommodated. In this example embodiment, in addition to the ball, a filling fluid is accommodated in the balancer 126.

A gasket 128 seals between the tub 122 and the cabinet 111. The gasket 128 is disposed between an inlet of the tub 122 and the cloth outlet/inlet 120. The gasket 128 alleviates shock to be transferred to the door 112 at the time of rotation of the drum 124 and prevents the washing water in the tub 122 from leaking out. The gasket 128 may include a circulation nozzle 127 through which the washing water flows into the drum 124.

The motor 113 rotates the drum 124. The motor 113 may rotate the drum 124 at various speeds or in various directions. The motor 113 includes a stator 113a around which a coil is wound and a rotator 113b that rotates by electromagnetically interacting with the coil.

The stator 113a may include a large number of coils wound therearound. The rotator 113b may include a large number of magnets that electromagnetically interact with the large number of coils. By the electromagnetic interaction of the coils with the magnets, the rotator 113b rotates. The rotational force of the rotator 113b is transmitted to the drum 124 to rotate the drum 124.

The motor 113 includes a hall sensor 113c configured to measure a position of the rotator 113b. The hall sensor 113c generates an on/off signal with the rotation of the rotator 113b. The speed and the position of the rotator 113b are estimated based on the on/off signal generated by the hall sensor 113c.

The detergent box 133 stores detergents such as a laundry detergent, a fiber softener, a bleach, and the like. The detergent box 133 may be provided on the front side of the cabinet 111 so as to be pulled out from the cabinet 111. When the washing water is supplied, the detergents in the detergent box 133 are mixed with the washing water and flow into the tub 122.

The cabinet 111 may include therein a water supply valve 131 configured to control the inflow of the washing water from an external water source, a water supply passage 132 through which the washing water flowing through the water supply valve 131 flows into the detergent box 133, and a water supply pipe 134 through which the washing water mixed with the detergents inside the detergent box 133 flows into the tub 122.

The cabinet 111 may include therein a drainage pipe 135 through which the washing water inside the tub 122 is drained out, a pump 136 configured to discharge the washing water inside the tub 122, a circulation passage 137 through which the washing water circulates, a circulation nozzle 127 through which the washing water flows into the drum 124, and a drainage passage 138 through which the washing water is drained out. According to an example embodiment, the pump 136 may include a circulation pump and a drain pump which are respectively connected to the circulation passage 137 and the drainage passage 138.

The control panel 114 may include an input part 114b that receives various operating instructions made by a user, such as a laundry course option, an operating time for each process, reservation, and the like, and a display part 114a that displays an operating state of the washing machine 100.

Next, the operation of the washing machine according to an example embodiment of the present disclosure will be described The user opens the door 112 to put the cloths into the drum 124. Subsequently, the user manipulates the control panel 114 to operate the washing machine 100. Upon the operation of the washing machine 100, a washing process in which the washing water mixed with the laundry detergent is soaked into the cloths and then the drum 124 is rotated to remove contaminants of the cloths, a rinsing process in which the washing water mixed with the fabric softener is soaked into the cloths and then the drum 124 is rotated to remove residual detergent from the cloths, and a dehydrating process in which the drum 124 is rotated at a high speed to dehydrate the laundry are sequentially performed. In each of the washing process, the rinsing process and the dehydrating process, watering, washing, rinsing, draining, dehydrating, drying, and the like are performed.

The dehydrating is an operation of rotating the drum 124 at a high speed to drain out the washing water soaked into the cloths, and is performed at the time of the washing process, the rinsing process, and the dehydrating process. At the time of the dehydrating operation, the drum 124 rotates at 400 RPM or more, or about 1,000 RPM at a maximum. In this case, when the drum 124 is unbalanced at a considerable level, a remarkable amount of vibration and noise occur. Further, in an example embodiment, at the time of performing the dehydrating process, the drum 124 may rotate in the range of a rotational speed of 560 to 640 RPM. By virtue of a centrifugal force generated by such a rotation, the washing water soaked into the laundry may be drained out. Further, the dehydrating process may be set such that the washing water is drained out while the drum 124 rotates in a specific speed range.

Accordingly, when the dehydrating is started, the rotational speed of the motor 113 is kept constant to measure the degree of unbalance of the drum 124. When the balancer 126 is positioned at a proper location, the motor 113 is accelerated. That is, a proper acceleration time point at which the motor 113 is to be accelerated is determined according to the degree of unbalance of the drum 124. The rotational speed of the motor 113 when measuring the degree of unbalance of the drum 124 may be 108 RPM, which is a maximum speed at which the laundry rotates in close contact with the inner wall of the drum 124 and noise and vibration do not occur greatly, but is not limited thereto.

Further, the washing machine 100 of an example embodiment may include a vibration sensor 150 provided therein.

In an example embodiment, vibration may occur with the rotation of the drum 124. The vibration sensor 150 may be provided to detect such a vibration. As an example, the vibration sensor 150 may be connected to one side of the tub122 to detect the vibration. The vibration sensor 150 may be installed at a place enough to detect the vibration caused with the rotation of the motor 113 inside the washing machine 100. In an example embodiment, the vibration sensor 150 may transmit a detected vibration value to a motor controller.

The motor control part may perform an operation of determining the presence of the vibration caused with the rotation of the motor 113 based on the detected vibration value from the vibration sensor 150 and controlling the vibration. As an example, the motor control part may control the motor 113 with both a compensation signal for vibration reduction in addition to a motor drive signal based on vibration information detected by the vibration sensor 150. The compensation signal for vibration reduction may have the form of a sinusoidal function that is set based on at least one phase angle. A specific form of the compensation signal will be described later.

Figure 3:
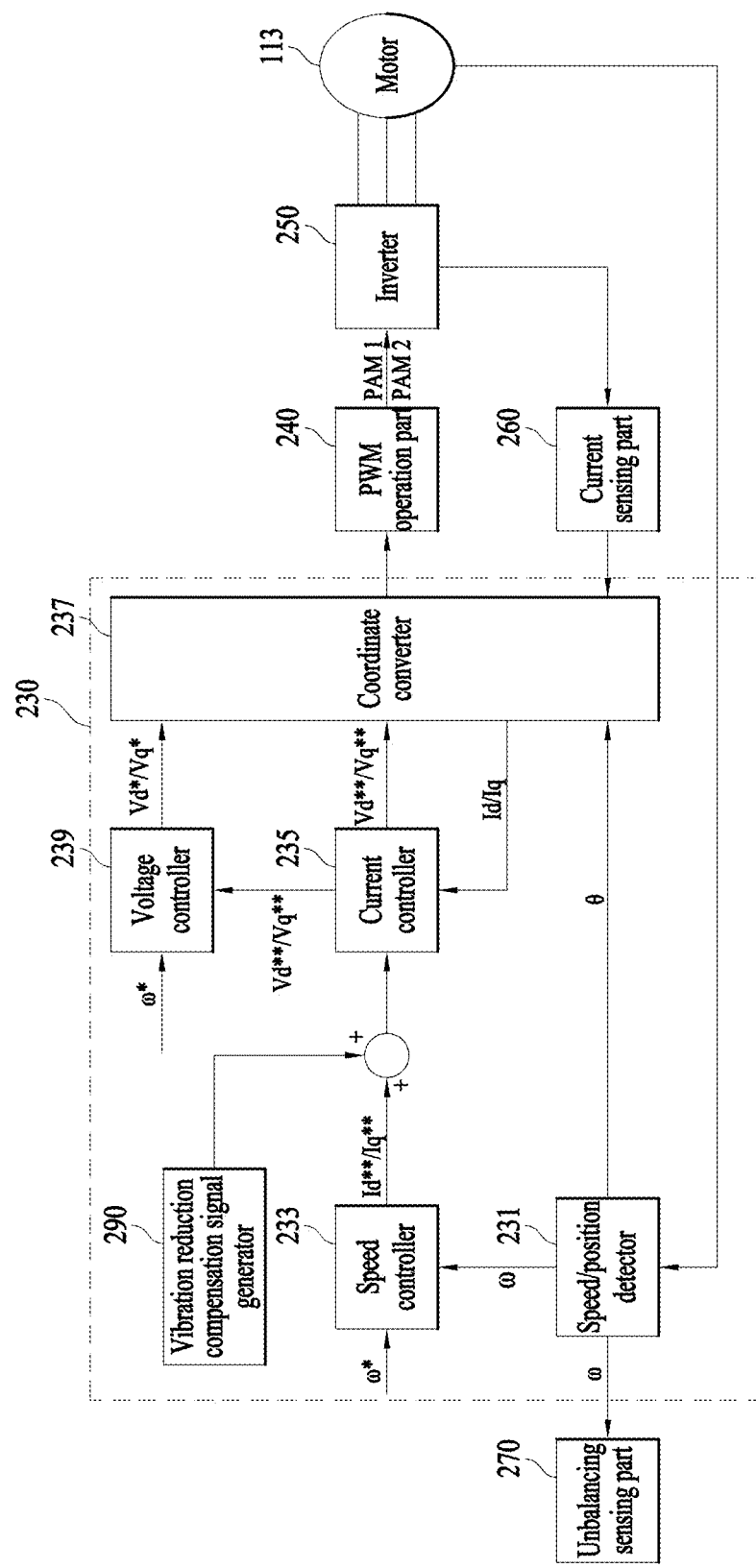
FIG. 3 is a block diagram illustrating a motor control device according to an example embodiment of the present disclosure.

FIG. 3 is a block diagram illustrating a motor control device according to an example embodiment of the present disclosure.

Referring to FIG. 3, the motor control device according to an example embodiment of the present disclosure includes a motor control part 230, a pulse width modulation (PWM) operation part 240, an inverter 250, a current sensing part 260, and an unbalancing sensing part 270.

The motor control part 230 controls power to be input to the motor 113. The motor control part 230 includes a voltage controller 239, a speed/position detector 231, a speed controller 233, a current controller 235, and a coordinate converter 237.

The voltage controller 239 outputs an instruction voltage value for an instruction speed. The voltage controller 239 stores instruction voltage values for respective instruction speeds obtained experimentally. The voltage controller 239 may store an instruction voltage value for an instruction speed for each rotational direction of the drum 124. Further, the voltage controller 239 may store instruction voltage values for each instruction speed according to the amount of the cloths accommodated in the drum 124.

The voltage controller 239 stores a d-axis instruction voltage value and a q-axis instruction voltage value on a d-q-axis rotation coordinate system which is defined as ad-axis parallel to a magnetic flux direction and a q-axis perpendicular to a magnetic flux direction of a permanent magnet, and outputs the d-axis instruction voltage value and the q-axis instruction voltage value to the coordinate converter 237 when an instruction speed is requested. The voltage controller 239 may newly store an instruction voltage value for the instruction speed and output the newly-stored instruction voltage value when the same instruction speed is input, which will be described later.

The coordinate converter 237 converts the d-q-axis rotation coordinate system and the uvw fixed coordinate system into each other. The coordinate converter 237 converts the instruction voltage value input to the d-q-axis rotation coordinate system into a three-phase instruction voltage value. Further, the coordinate converter 237 converts a present current of the uvw fixed coordinate system detected by the current sensing part 260 (to be described later) into the d-q-axis rotation coordinate system. The coordinate converter 237 receives a position θ of the rotator 113b detected by the speed/position detector 231 (to be described later) and converts the coordinate system based on the position Θ.

The PWM operation part 240 receives a signal of the uvw fixed coordinate system output from the motor control part 230 to generate a PWM signal. The inverter 250 receives the PWM signal from the PWM operation part 240 to directly control the power to be input to the motor 113. The current sensing part 260 detects the present current output from the inverter 250. According to an example embodiment, the PWM operation part 240 may be included in the inverter 250. The inverter 250 may include at least one switching element. The inverter 250 may control the switching element to convert a voltage of a direct current (DC) stage into an alternating current (AC) power and output the same to the motor 113. The driving of the motor 113 may be controlled under the above-described control of the inverter 250.

The speed/position detector 231 detects a rotational speed and a position of the rotator 113b of the motor 113. The speed/position detector 231 detects the rotational speed and the position of the rotator 113b based on the position of the rotator 113b detected by the hall sensor 113c. According to an example embodiment, the speed/position detector 231 may detect the rotational speed of the motor 113 based on the current detected by the current sensing part 260.

The speed controller 233 performs a proportional-integral-derivative (PIO) control on the rotational speed of the rotator 113b detected by the speed/position detector 231 to generate each of ad-axis instruction current value and a q-axis instruction current value on the d-q-axis rotation coordinate system so that the rotational speed follows the instruction speed. In a case in which the rotational speed of the rotator 113b detected by the speed/position detector 231 is maintained with slight fluctuations, the speed controller 233 compares an average value of the fluctuation values with the instruction speed.

The current controller 235 performs the PIO control on the present current detected by the current sensing part 260 to generate each of a d-axis instruction voltage value and a q-axis instruction voltage value.

The unbalancing sensing part 270 measures a degree of unbalance of the drum 124 based on the rotational speed of the rotator 113b detected by the speed/position detector 231. The unbalancing sensing part 270 measures the degree of unbalance of the drum 124 by measuring a change in the rotational speed of the rotator 113b.

While the drum 124 is rotating at a constant speed, when the drum 124 is unbalanced, the rotational speed of the rotator 113b may fluctuate slightly. The unbalancing sensing part 270 measures the degree of unbalance based on such a change in the rotational speed of the rotator 113b. The unbalancing sensing part 270 measures the degree of unbalance using a difference between the change in the rotational speed of the rotator 113b and a previously-stored reference speed change. The reference speed change is stored differently according to the amount of the cloths. The difference between the change in the rotational speed of the rotator 113b and the reference speed change varies with time. Thus, the unbalancing sensing part 270 calculates, as an unbalance value, a value obtained by averaging the maximum value and the minimum value of difference values between the change in the rotational speed of the rotator 113b and the reference speed change.

When the unbalancing sensing part 270 measures the degree of unbalance, it is desirable that the drum 124 is rotated at a maximum speed at which the cloths are in close contact with the inner wall of the drum 124 and noise and vibration do not occur greatly. In this example embodiment, the drum 124 may rotate at the rotational speed of 108 RPM.

Further, in an example embodiment, the amount of the cloths accommodated in the drum 124 may be calculated based on a current applied to the motor 113 in at least one of an acceleration section in which the rotation of the drum 124 is accelerated and a deceleration section in which the rotation of the drum 124 is decelerated when the motor 113 drives the drum 124. As an example, the amount of the cloths accommodated in the drum 124 may be calculated based on a torque of the motor 113, which is determined using the current when the rotation of the drum 124 is accelerated or decelerated. When the drum 124 is rotated by the drive of the motor 113, various forces may act on the drum 124 in which the laundry is accommodated. When the drum 124 rotates, a motor torque, an inertia torque, a friction torque, and a load torque act on the drum 124. On the other hand, while the drum 124 is rotating, a force acting on the laundry at an angle $\Theta_m$ is as follows. The force is a force acting when the drum 124 is moved by the angle $\Theta_m$ in a state in which the rotation of the drum 124 is halted.

The motor torque is a force required for the operation of the motor. Thus, the motor torque is the sum of the inertia torque, the friction torque, and the load torque. More specifically, the motor torque $T_e$ required for the rotation of the motor is expressed by the following equation:

$$T_e = J_m \frac{d\omega_m}{dt} + B_m \omega_m + T_L = \frac{3}{2} \frac{P}{2} K_e i_{qe} \qquad \text{[Equation 1]}$$

In Equation 1, $J_m$ is the inertia coefficient, $\omega_m$ is the angular velocity of the motor, $B_m$ is the friction coefficient of the laundry, $T_L$ is the load torque, P is the power supplied to the motor, $K_e$ is the torque constant, and $i_{qe}$ is the torque current supplied to the motor.

As components of the above motor torque $T_e$, $$J_m \frac{d\omega_m}{dt},$$

$B_m \omega_m$, and $T_L$ correspond to the inertia torque, the friction torque, and the load torque, respectively.

In an example embodiment, since the friction torque may have a deviation according to the type of the laundry, compensation for the friction torque is required for accurate measurement.

The motor torque corresponds to a value obtained by multiplying the force of lifting up the laundry by the radius of the drum. The inertia torque is the force of inertia acting on the drum or inertia acting on the drum according to the distribution of the laundry when the drum accelerates or decelerates while rotating, which acts as a force that prevents the rotational operation. In this case, the inertia torque is proportional to the mass and the square of the radius of the drum. The friction torque is a frictional force acting between the laundry and the tub, between the laundry and the door, and between the drive belt and the drum, and is therefore proportional to the rotational speed. The friction torque may be calculated as the product of the friction coefficient and the rotational speed. The load torque is a gravity acting according to the distribution of the laundry at the time of start-up, which may be calculated from the weight of the laundry, the gravitational acceleration, the radius of the drum, the angle of the drum and the like.

More specifically, the motor torque is a force exerted to rotatably operate the motor connected to the drum. The inertia torque is an inertia that tries to maintain the current motion state (rotation state) when the drum accelerates or decelerates while rotating, which prevents the rotational operation of the drum. The friction torque is a force that prevents the rotational operation due to the friction between the drum and the laundry, the friction between the door and the laundry, or the friction between pieces of laundry, and the friction between the drive belt and the drum. The load torque is a force that prevents the rotational operation due to the weight of the laundry.

The motor control part 230 may measure a torque value to estimate the motor torque $T_e$. The motor control part 230 may detect a change in the amount of the laundry based on the measured torque value and may detect the amount of the laundry based on the detected weight change. The motor control part 230 may measure a feedable current value and a maintenance current value based on the torque constant, determine the torque value based on them, and detect the weight of the laundry based on the determined torque value. On the other hand, it is necessary to consider the effect of the torque constant on the measured current value. That is, it is necessary to consider the effect of the torque constant $K_e$ by compensating the distribution on the counter-electromotive force of the motor by compensating the current in the maintenance section from the current in the acceleration section. More specifically, the load relating to the rotation of the motor may be expressed as "average of current in acceleration section minus average of current in maintenance section/2."

The force acting on the laundry at a predetermined angle $\Theta_m$ may be a force by gravity. However, since the drum is rotating, the force may be calculated by multiply the gravity by sin ($\Theta_m$). The force by gravity is determined by the gravitational acceleration, the radius of the drum and the mass.

During the rotation of the drum, the motor torque, the inertia torque, the friction torque, the load torque act simultaneously. The components of such forces are reflected in the current value of the motor. Thus, the controller calculates the weight of the laundry using the current value supplied to the motor.

In the case of the motor torque, there is a problem in that the influence of gravity by the weight is large and the measurement resolution is low when the weight of the laundry is equal to or larger than a certain value. That is, when the weight of the laundry is increased to a specific value or more, the measurement error in weight may increase with the increase in the weight of the laundry.

The friction torque increases in value when the laundry and the door rub against each other or the laundry is caught in the door. Accordingly, the spread (dispersion) of the friction torque may increase depending on the type of the laundry. In particular, as the weight of the laundry increases, the dispersion of the friction torque increases greatly.

The load torque has a deviation in value due to the movement of the laundry. In addition, the movement of the laundry is reduced when the weight of the laundry is a certain valve or more. This may cause a reverse phenomenon in which the load torque is decreased.

In contrast, the inertia torque is affected by the movement of the laundry, but is in a linear relationship with the amount (weight) of the laundry. Thus, the amount of the laundry can be more accurately measured. Further, the weight of the laundry can be more accurately measured by estimating the inertia torque.

In this case, the inertia torque is a force to maintain a certain state, and therefore acts during acceleration or deceleration. That is, the inertia torque acts in the acceleration section and the deceleration section, but not act when the rotational speed is kept constant. Thus, in the acceleration section and the deceleration section, merely the motor torque, the friction torque, and the load torque due to gravity act.

Thus, the characteristic of the inertia torque can be calculated by excluding data in the maintenance section from data in the acceleration section. The inertia can be calculated by subtracting the current value in the maintenance section from the current value in the acceleration section and the current value in the deceleration section, dividing the subtraction result by a change in speed per hour, namely acceleration, and then multiplying the division result by the reverse electromotive force.

Thus, the motor control part 230 may analyze the forces acting in the acceleration section, the deceleration section and the maintenance section to determine the amount of the laundry based on the inertia torque. Further, the motor control part 230 may calculate the force of gravity according to the amount of the laundry in the maintenance section. The inertia is minimized in characteristic in the maintenance section and greatly acts in the acceleration section and the deceleration section. Thus, the motor control part 230 may determine the final amount of the laundry by calculating laundry amount sensing values based on different pieces of such data and comparing them with each other.

Further, the motor control part 230 measures a current value during the rotation of the motor to calculate the amount of the laundry. Thus, errors due to positioning of the motor at the time of start-up may be excluded. In addition, since the state of the load is not changed during the maintenance section, that is, because the laundry does not move irregularly during the maintenance section, errors due to a variation in the load may be minimized.

In an example embodiment, the motor control part 230 may perform rotation of the same pattern at a cycle of 10 seconds. An example of the pattern may include at least one of the acceleration section, the deceleration section, and the maintenance section. At least one of the amount and weight of the laundry may be estimated based on the inertia torque derived in the respective section(s).

Further, in an example embodiment, the acceleration section and the deceleration section may be set during the rotation of the drum. The rotational speed of the drum may be increased in the acceleration section, and may be decreased in the deceleration section. When a change in the rotational speed in the acceleration section and a change in the rotational speed the deceleration section correspond to each other, the inertia torque may be estimated based on a difference in the respective rotation torque.

More specifically, a motor torque $T_{ACC}$ in the acceleration section is as follows.

$$T_{ACC} = J_m \frac{d\omega_m}{dt} + B_m \omega_m + T_L \qquad \text{[Equation 2]}$$

A motor torque $T_{DEC}$ in the deceleration section is as follows.

$$T_{DEC} = -J_m \frac{d\omega_m}{dt} + B_m \omega_m + T_L \qquad \text{[Equation 3]}$$

When a change in angular velocity in the acceleration section and a change in angular velocity in the deceleration section correspond to each other, the inertia torque may be estimated by the following equation.

$$T_{ACC} - T_{DEC} = 2 * J_m \frac{d\omega_m}{dt} \qquad \text{[Equation 4]}$$

By controlling the rotation of the motor in the acceleration section and the deceleration section with slopes corresponding to each other as described above, it is possible to measure the pure inertia torque from which the sample deviation and the like are removed. Further, in an example embodiment, the motor control part may estimate the inertia torque using current values corresponding to each other in the acceleration section and the deceleration section based on the above-described relationships.

By estimating the inertia torque in this manner, the motor control part of the washing machine can identify the state of the laundry inside the drum, thus sensing the amount of the laundry and the unbalance of the laundry.

Further, the motor control part 230 according to an example embodiment may include a vibration reduction compensation signal generator 290. A vibration reduction compensation signal generated at the vibration reduction compensation signal generator 290 may be provided as an input to the current controller 235 together with the signal from the speed controller 233. By these signals, the drive of the motor may be controlled. The vibration reduction compensation signal generator 290 may detect vibration with the vibration sensor 150, apply a vibration attenuation rate to the detected vibration to derive a phase angle $\Theta_U$ through an integral gain and integral proportional gain, generate a sinusoidal function including a mechanical angle $\Theta_m$ and the phase angle $\Theta_U$, and generate a sinusoidal function current instruction for vibration reduction based on the generated sinusoidal function and a forward compensation current. Such a sinusoidal function current instruction for vibration reduction may adaptively change with vibration. This reduces vibration caused with the drive of the motor. On the other hand, the speed controller 233 may perform the existing speed or torque control irrespective of the operation of the vibration reduction compensation signal generator 290. The instruction signal for the speed or torque control and the sinusoidal function current instruction for vibration reduction generated at the vibration reduction compensation signal generator 290 may be mixed with each other to be input to the current controller 235. The current controller 235 may be a proportional integral (PI) current controller, but is not limited thereto.

As described above, the vibration reduction compensation signal generator 290 generates the compensation signal based on the vibration detected by the vibration sensor 150, and the motor is driven based on the compensation signal. This makes it possible to reduce the vibration.

Figure 4:
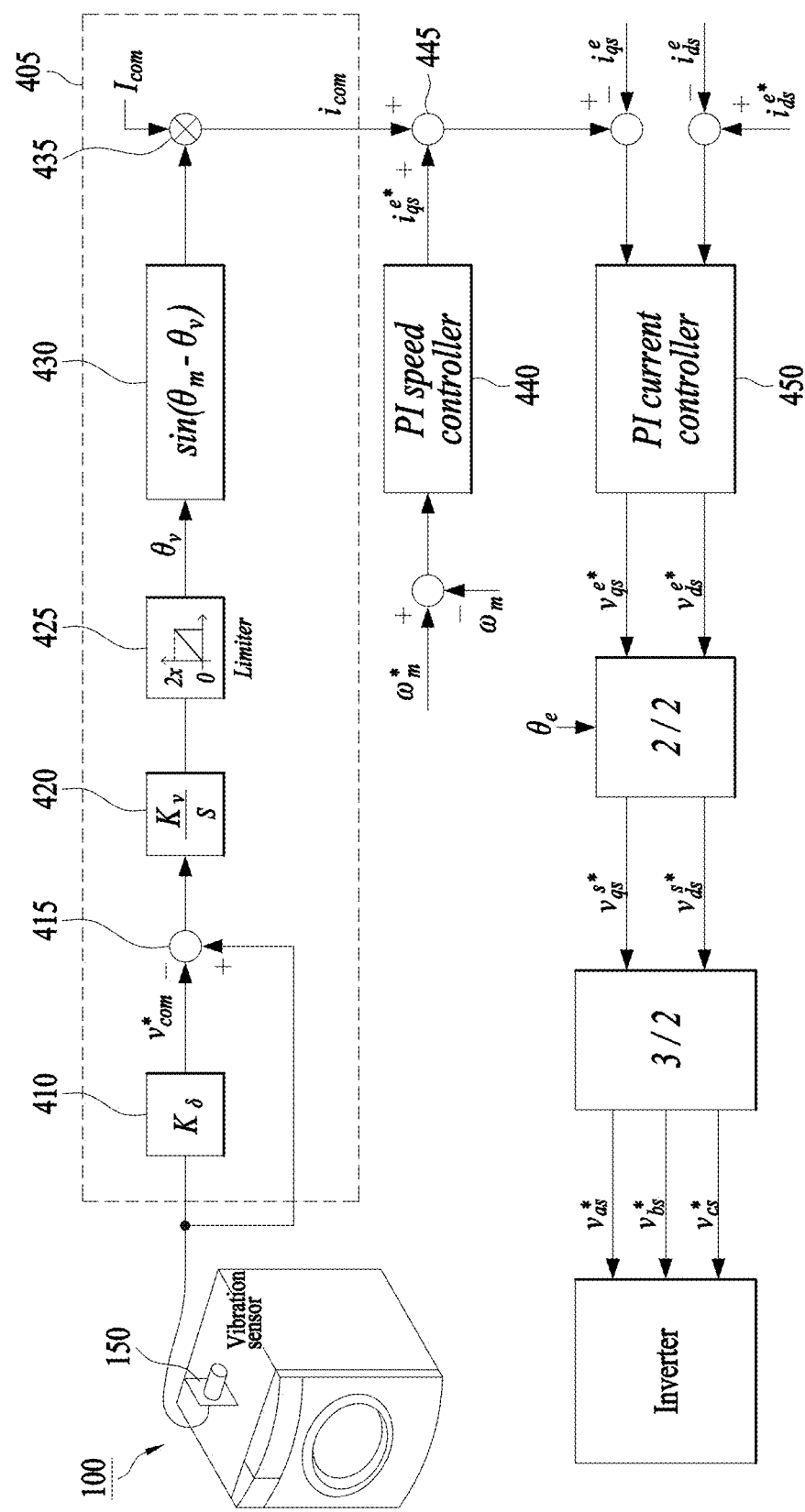
FIG. 4 is a block diagram for explaining a method of generating a motor control signal according to an example embodiment of the present disclosure.

FIG. 4 is a block diagram for explaining a method of generating a motor control signal according to an example embodiment of the present disclosure.

Referring to FIG. 4, there is illustrated a method in which a vibration reduction compensation signal generator 405 generates a compensation signal based on the vibration detected by the vibration sensor 150 in the washing machine 100 according to an example embodiment of the present disclosure.

The vibration sensor 150 may be provided on one side of the washing machine 100. The vibration sensor 150 may be provided at a portion at which vibration caused with the rotation of the motor can be measured. As an example, the vibration sensor 150 may be provided on one side of the tub 122. A signal obtained by measuring the vibration caused with the rotation of the motor may be provided to the vibration reduction compensation signal generator 405.

A vibration attenuation rate gain $K_\delta$ may be applied in a section indicated by reference numeral 410. As an example, the vibration attenuation rate gain $K_\delta$ may be set to 0.7 to reduce the vibration by 30%. A vibration instruction v*com to which the vibration attenuation rate gain $K_\delta$ is applied may be output. In a section indicated by reference numeral 415, an operation is performed on both the vibration instruction and a direct current (DC) component in the actual vibration.

In a section indicated by reference numeral 420, an integral gain ora sum of the integral gain and a proportional gain may be estimated based on the vibration instruction to which the attenuation rate is applied. As a result, a phase angle-following integral gain K may be derived.

Subsequently, in a section indicated by reference numeral 425, the phase angle $\theta_U$ may be derived by a limiter.

Thereafter, in a section indicated by reference numeral 430, the sinusoidal function including the mechanical angle $\theta_m$ and the phase angle $\theta_U$ may be derived.

In a section indicated by reference numeral 435, a forward compensation torque instruction ion in which the mechanical angle $\theta_m$ and the phase angle $\theta_U$, are reflected, may be derived through an operation with a forward compensation torque current $i_{com}$. This forward compensation torque instruction $i_{com}$ may function as the sinusoidal function current instruction for vibration reduction.

In a section indicated by reference numeral 440, a proportional integral controller may be provided. By this proportional integral controller, a signal for controlling the drive of the motor may be derived. As an example, a signal $i_{qs}^{e*}$ may be output for the drive control of the motor. The signal lase may be summed with the sinusoidal function current instruction for vibration reduction $i_{com}$ in a section indicated by reference numeral 445. The summed result may be input to one side of a current controller indicated by reference numeral 450. In an example embodiment, the current controller indicated by reference numeral 450 may be a proportional integral current controller.

As described above, it is possible to provide the effect of reducing the vibration by deriving the phase angle $\theta_U$ based on the sensing result by the vibration sensor, and generating the sinusoidal signal including the mechanical angle $\theta_m$ and the phase angle $\theta_U$, generating the sinusoidal function current for vibration reduction based on the generated sinusoidal signal, and inputting the sinusoidal function current for vibration reduction together with the typical motor control signal to the current controller.

In an example, the vibration reduction compensation signal generator 405 has one time the magnitude of the mechanical angle, and generates a forward compensation torque current for vibration reduction having a sinusoidal frequency component. Based on the forward compensation torque current, the drive of the motor is performed. This adaptively reduces the vibration.

Although in an example embodiment, the instruction signal for the drive of the motor and the compensation signal for vibration reduction have been described to be generated in separate configurations and then are summed with each other, the present disclosure is not limited thereto. As an example, the instruction signal for the drive of the motor may be generated to include the compensation signal for vibration reduction. In this case, the instruction signal may include the compensation signal component for vibration reduction.

As described above, by generating an additional signal capable of actively reducing the vibration based on the information detected by the vibration sensor and controlling the drive of the motor based on the additional signal, it is possible to provide an effect of reducing the vibration without incurring a large change in the driving state of the motor the vibration without having to use a separate mechanical apparatus.

In the above, the method of deriving the sinusoidal function current instruction for vibration reduction is merely one example. A motor drive signal that is capable of controlling the vibration based on the information acquired by the vibration sensor without substantially affecting a drive RPM or torque of the motor, may be generated. This naturally belongs to the technical scope of the present disclosure.

Figure 5:
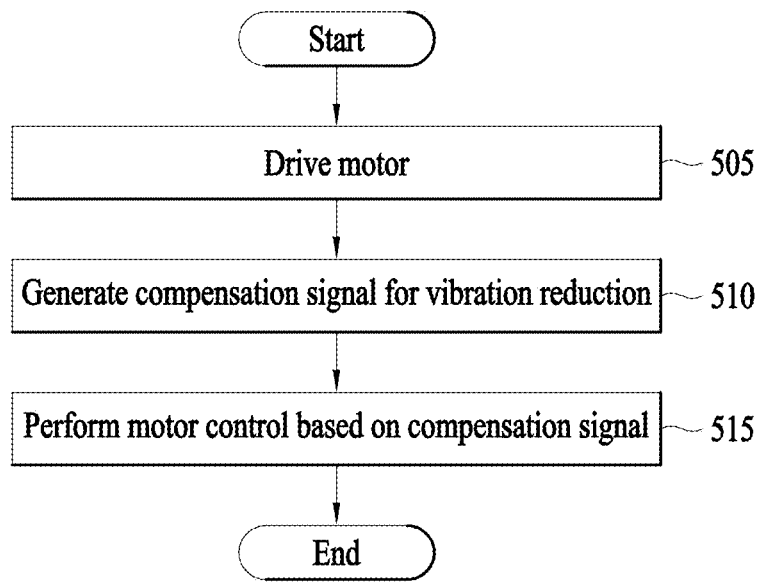
FIG. 5 is a flowchart for explaining a motor control method according to an example embodiment of the present disclosure.

FIG. 5 is a flowchart for explaining a motor control method according to an example embodiment of the present disclosure.

Referring to FIG. 5, the motor control method according to an example embodiment of the present disclosure is illustrated.

In operation 505, the drive of the motor is started. The drive of the motor may be performed through switching of an inverter according to a control signal of a controller.

In operation 510, the controller may generate a compensation signal for vibration reduction. In an example embodiment, the compensation signal for vibration reduction may be generated based on vibration detected by the vibration sensor. Further, the compensation signal for vibration reduction may include a signal in the form of a sinusoidal wave generated based on information about the mechanical angle of the motor and the phase angle associated with the compensation signal. The compensation signal may be generated based on the signal in the form of a sinusoidal wave and a forward compensation current. Further, in an example embodiment, the compensation signal for vibration reduction may be generated to correspond to the drive of the motor, or may be generated when a specific condition is satisfied. In an example embodiment, the specific condition may be determined based on at least one of an actual drive RPM of the motor, an instruction RPM, a vibration detected by the vibration sensor, and a driving load of the motor.

In operation 515, the controller may perform the motor control in consideration of the compensation signal. According to an example embodiment, the controller may generate an instruction signal for controlling a rotational speed of the motor. Responsive to this instruction signal, the motor may rotate at a respective speed. A compensation signal for vibration reduction may be added to the instruction signal to control the motor. More specifically, a motor drive control signal in which the compensation signal for vibration reduction is added to the instruction signal, may be input to the current controller. The current controller may control the drive of the motor based on the motor drive control signal. Although in the above example embodiment, the compensation signal for vibration reduction has been described to be added to the instruction signal to generate the motor drive control signal, the present disclosure is not limited thereto. Another compensation signal may be generated by performing an additional operation based on the compensation signal and the instruction signal.

In an example embodiment, the controller may adaptively change the phase angle in consideration of the signal detected by the vibration sensor and the mechanical angle of the motor. The vibration caused with the drive of the motor may be reduced with a change in the phase angle.

As described above, it is possible to provide the effect of actively controlling the vibration without having to use a separate mechanical apparatus by sensing the vibration caused with the drive of the motor by the vibration sensor and using the signal in the form of a sinusoidal wave as an input for the drive of the motor.

Figure 6:
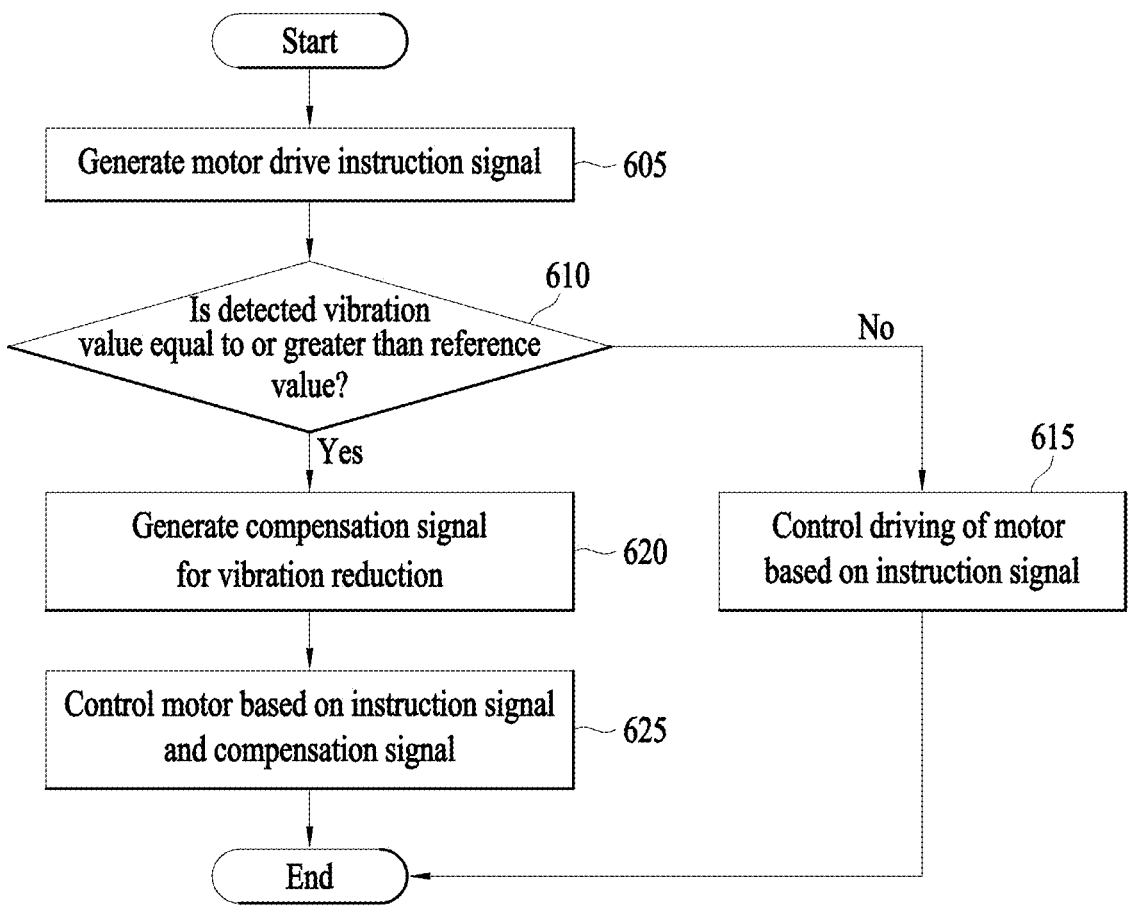
FIG. 6 is a flowchart for explaining a motor control method according to another example embodiment of the present disclosure.

FIG. 6 is a flowchart for explaining a motor control method according to another example embodiment of the present disclosure.

Referring to FIG. 6, the motor control method according to another example embodiment of the present disclosure is illustrated. More specifically, in this example embodiment, there is illustrated a method of generating a compensation signal for vibration reduction to reduce vibration when a value of vibration detected after the drive of the motor is equal to or larger than a preset reference value.

In operation 605, the controller may generate a motor drive instruction signal. In an example embodiment, the motor drive instruction signal may include a signal for controlling an RPM of torque of the motor.

In operation 610, the controller may identify whether the valve of the vibration detected by the vibration sensor in accordance with the drive of the motor, is equal to or greater than the reference value. In an example embodiment, the reference value may be a fixed value, and may be set to another value according to a drive RPM of the motor, an instruction RPM, an instruction torque of the motor, or a drive torque of the motor.

When the detected vibration value is not equal to or greater than the reference value, in operation 615, the controller may control the drive of the motor based on the instruction signal. In an example embodiment, in a case in which the vibration does not exceed a preset criteria according to the nature of a load associated with the drive of the motor, the motor may be driven based on merely the instruction signal without generating the compensation signal for vibration reduction.

When the detected vibration value is equal to or greater than the reference value, in operation 620, the controller may generate the compensation signal for vibration reduction. In an example embodiment, the compensation signal may be generated by the method in the embodiments described above.

In operation 625, the controller may control the motor based on the instruction signal and the compensation signal. In an example embodiment, when the degree of the vibration of the motor is decreased to be less than the reference value, the drive of the motor may be controlled without applying the compensation signal for vibration reduction.

As described above, by determining whether to apply the compensation signal for vibration reduction based on the result of comparison between the detected vibration value and the reference value, and adaptively applying the compensation signal for vibration reduction according to the determination result, it is possible to intuitively control the drive of the motor with merely the instruction signal without applying the compensation signal when the detected vibration value is smaller than the reference value.

Figure 7:
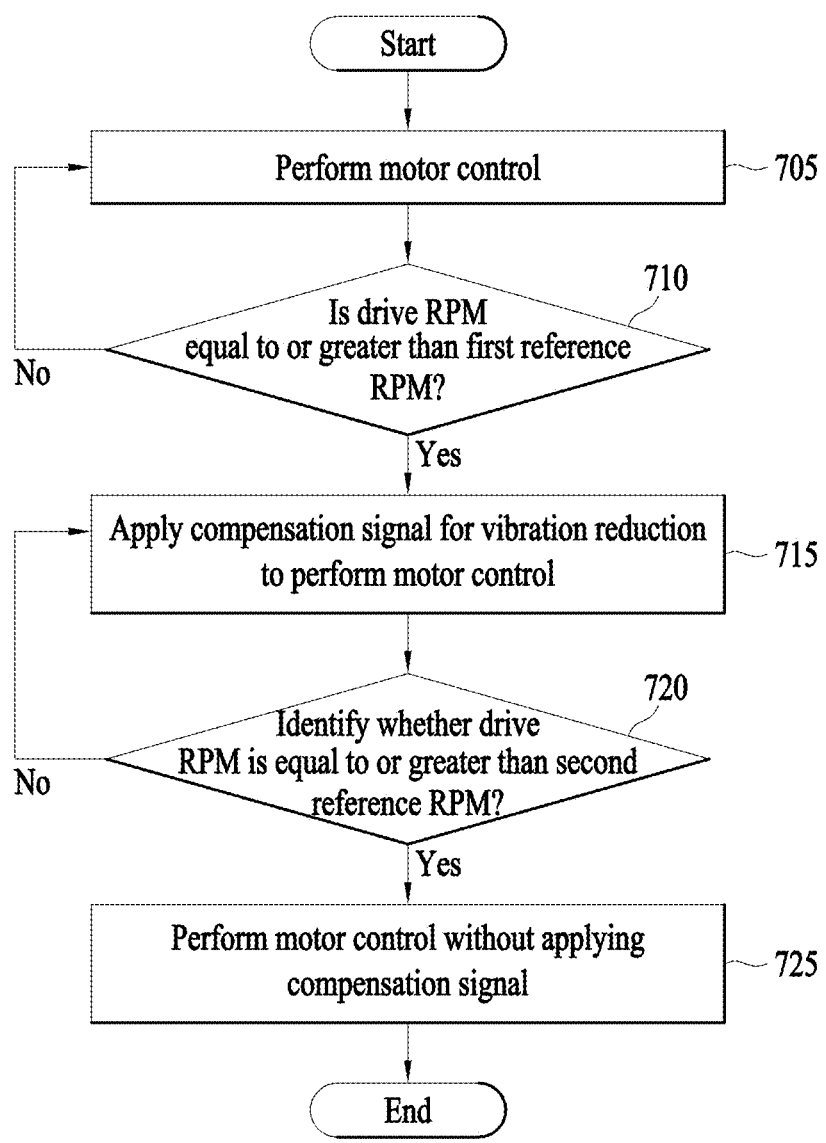
FIG. 7 is a flowchart for explaining a motor control method according to still another example embodiment of the present disclosure.

FIG. 7 is a flowchart for explaining a motor control method according to still another example embodiment of the present disclosure.

Referring to FIG. 7, the motor control method according to still another example embodiment of the present disclosure is illustrated. More specifically, in this example embodiment, there is illustrated a method of determining whether to apply a compensation signal for vibration reduction based on results of comparison between a drive RPM of the motor and a plurality of reference RPMs at the time of driving the motor, and controlling the motor according to the determination result.

In operation 705, the controller may perform a motor control. The motor control may be performed based on an instruction signal. The controller may apply the compensation signal for vibration reduction together with the instruction signal. Further, in an example embodiment, the motor control may be performed such that the motor is driven at an RPM corresponding to the washing process.

In operation 710, the controller may identify whether or not the drive RPM of the motor is equal to or greater than a first reference RPM.

When the drive RPM of the motor is less than the first reference RPM, the controller may continuously perform the motor control based on the instruction signal in operation 705.

When the drive RPM of the motor is equal to or greater than the first reference RPM, in operation 715, the controller may apply the compensation signal for vibration reduction to perform the motor control. In an example embodiment, the compensation signal for vibration reduction may be generated like in the above-described example embodiments. The controller may perform the motor control based on both the compensation signal for vibration reduction and the instruction signal for motor drive. In addition, in an example embodiment, when the drive RPM of the motor is decreased to be less than the first reference RPM, the controller may perform the motor control merely with the instruction signal without applying the compensation signal for vibration reduction.

In operation 720, the controller may identify whether or not the drive RPM of the motor is equal to or greater than a second reference RPM.

When the drive RPM of the motor is smaller than the second reference RPM and is equal to or larger than the first reference RPM, the controller may continuously apply the compensation signal for vibration reduction to perform the motor control.

When the drive RPM of the motor is equal to or larger than the second reference RPM, in operation 725, the controller may again perform the motor control with merely the instruction signal without applying the compensation signal for the vibration reduction.

Although in the above example embodiment, the controller has been described to perform the motor control using the results obtained by comparing the drive RPM with the reference RPMs, a modified manner in which the reference RPMs are compared with an instruction RPM may be employed. In some cases, the drive RPM may be estimated based on a current flowing through at least one of three phases of the motor according to an instruction, and whether to apply the compensation signal for vibration reduction may be determined by comparing the reference RPMs with the estimated drive RPM.

In a case in which the degree of vibration becomes large in a specific RPM zone in the motor control, the reference RPMs may be set such that the specific RPM zone is defined between the first reference RPM and the second reference RPM. Based on this, a vibration reduction operation may be performed.

Figure 8:
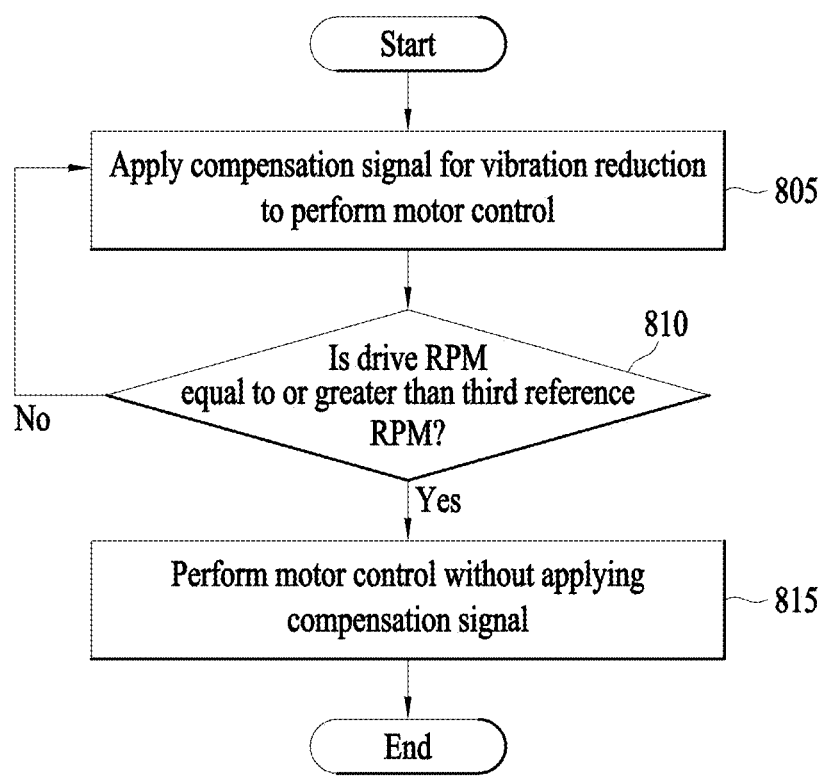
FIG. 8 is a flowchart for explaining a motor control method according to yet another example embodiment of the present disclosure.

FIG. 8 is a flowchart for explaining a motor control method according to yet another example embodiment of the present disclosure.

Referring to FIG. 8, the motor control method according to yet another example embodiment of the present disclosure is illustrated. More specifically, in this example embodiment, there is illustrated a method in which the motor control is performed by basically applying the compensation signal for vibration reduction at the time of driving the motor, and when the motor is operated at a drive RPM equal to or higher than reference RPMs as a result of comparing the reference RPMs and the drive RPM, the motor control is performed without applying the compensation signal for vibration reduction.

In operation 805, the controller may apply the compensation signal for vibration reduction together with the instruction signal for motor drive to perform the motor control. The compensation signal for vibration reduction may be generated like in the above-described example embodiments.

In operation 810, the controller may identify whether or not the drive RPM of the motor is equal to or greater than a third reference RPM. When the drive RPM of the motor is less than the third reference RPM, in operation 805, the controller may apply the compensation signal for vibration reduction to perform the motor control.

When the drive RPM of the motor is equal to or greater than the third reference RPM, in operation 815, the controller may perform the motor control without applying the compensation signal for vibration reduction.

Although in the above example embodiments, the controller has been described to perform the motor control using the results obtained by comparing the drive RPM with the reference RPMs, a modified manner in which the reference RPMs are compared with an instruction RPM may be employed. In an alternative example embodiment, the drive RPM may be estimated based on a current flowing through at least one of three phases of the motor according to an instruction, and whether to apply the compensation signal for vibration reduction may be determined by comparing the reference RPMs with the estimated drive RPM.

As described above, by applying the compensation signal for vibration reduction when the motor is driven at a drive RPM lower than a specific RPM, it is possible to perform the motor control in a stable manner merely with the instruction signal without applying the compensation signal for vibration reduction at the time of driving at a high speed. Further, the third reference RPM may be set to be higher than value in a drive RPM zone in which vibration mainly occurs. Thus, by applying the compensation signal for vibration reduction in a zone in which the vibration needs to be reduced, it is possible to controlling the vibration in an efficient manner.

Figure 9A:
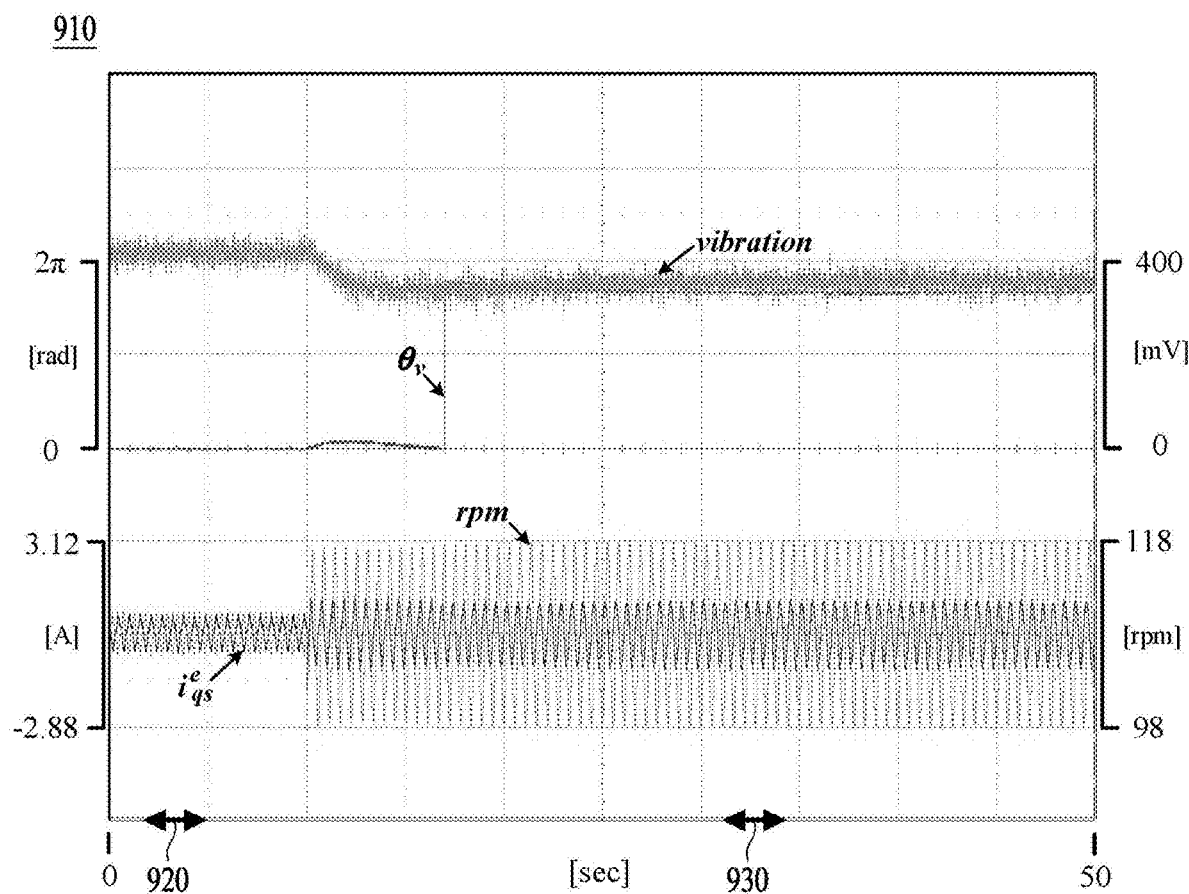
FIGS. 9A to 9C are diagrams illustrating a vibration, a mechanical angle, a compensation angle, an instruction signal, and a torque current at the time of motor control according to an example embodiment of the present disclosure.
Figure 9B:
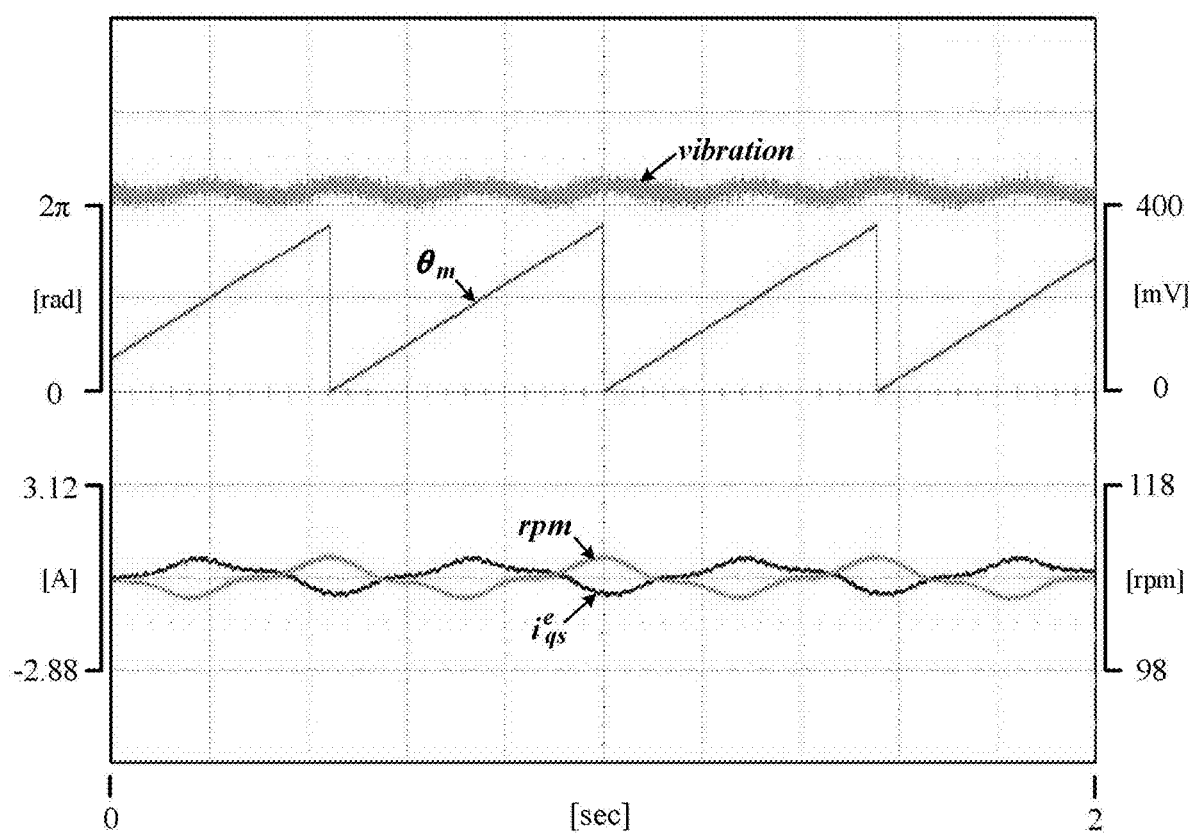
Figure 9C:
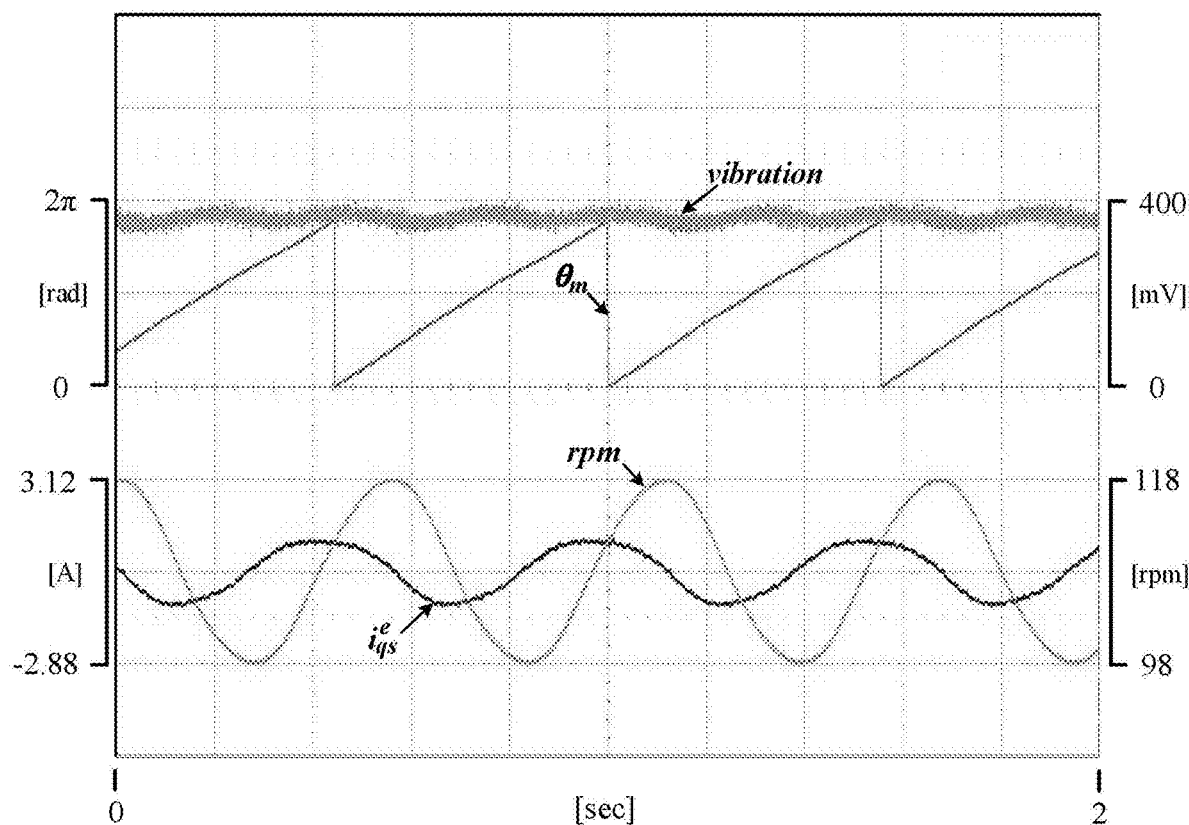

FIGS. 9A to 9C are diagrams illustrating a vibration value, a mechanical angle, a compensation angle, an instruction signal, and a torque current at the time of motor control according to an example embodiment of the present disclosure. In an example embodiment, the load torque is set to 0 kilogram (Kg), the driving speed is set to 108 rpm and the frequency of the mechanical angle is set to 1.78 Hertz (Hz).

Referring to FIG. 9A, the motor is driven according to an example embodiment of the present disclosure, and the vibration value, the phase angle $\theta_U$, the instruction current $i^e_{qs}$, and the drive RPM associated with the drive of the motor are illustrated as indicated by reference numeral 910.

In an example embodiment, the vibration value corresponds to a voltage output from the vibration sensor, which has a value close to 400 millivolt (mV). The phase angle $\theta_U$ may have a value of 0 to 2π. The drive RPM may vary in the range of 98 to 118 RPM in this example embodiment.

The compensation current for vibration reduction is generated and the phase angle $θ_U$ is changed starting from 0. Thereafter, the phase angle $θ_U$ may be adaptively changed according to a change in vibration. When an optimal value is obtained, the compensation current for vibration reduction is generated. In an example embodiment, the phase angle $θ_U$ may have a value of 5.28 rad, and thus a forward compensation torque current has a value of 3 ampere (A).

In an example embodiment, a state before the application of the compensation signal for vibration reduction is illustrated by reference numeral 920 of FIG. 9B on an enlarged scale, and a state after the application of the compensation signal for vibration reduction is illustrated by reference numeral 930 of FIG. 9C on an enlarged scale.

As illustrated by reference numeral 920 of FIG. 9B, the vibration value, the mechanical angle $θ_m$, the instruction current $i^e_{qs}$, and the drive RPM are illustrated. The output value of the vibration sensor is higher than 400 mV, the mechanical angle $θ_m$ is changed in the range of 0 to 2π with reference to 1.78 Hz, the instruction current $i^e_{qs}$ is changed in the range of about 3 A, and the drive RPM is also changed in the range of about 108 RPM.

As illustrated by reference numeral 930 of FIG. 9C, the vibration value, the mechanical angle $θ_m$, the instruction current $i^e_{qs}$, and the drive RPM are illustrated. The output value of the vibration sensor is lower than 400 mV, the mechanical angle $θ_m$ is changed in the range of 0 to 2π with reference to 1.78 Hz, the instruction current $i^e_{qs}$ is changed in the range of 2.94 A to 3.06 A with reference to 3 A, and the drive RPM is also changed in the range of 98 to 108 RPM with reference to of 108 RPM.

When the compensation current for vibration reduction is applied as described above, the vibration decreases, and the rotation RPM of the motor or the instruction current vary greatly. However, the average drive RPM of the motor has value corresponding to the driving speed. By operating in this way, the motor may be driven at a desired RPM even if the drive RPM of the motor is changed. Thus, it is possible to provide an effect of reducing the vibration.

Figure 10A:
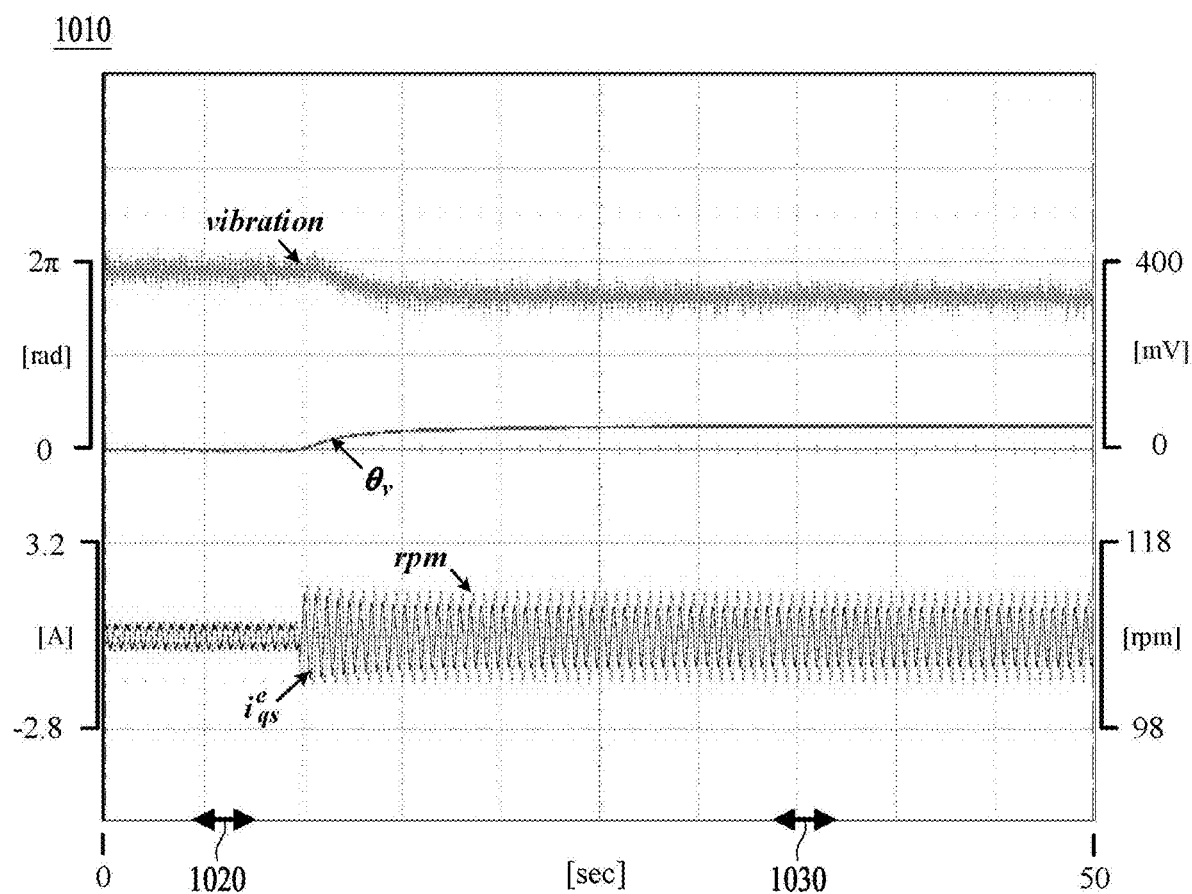
FIGS. 10A to 10C are diagrams illustrating a vibration, a mechanical angle, a compensation angle, an instruction signal, and a torque current at the time of motor control according to another example embodiment of the present disclosure.
Figure 10B:
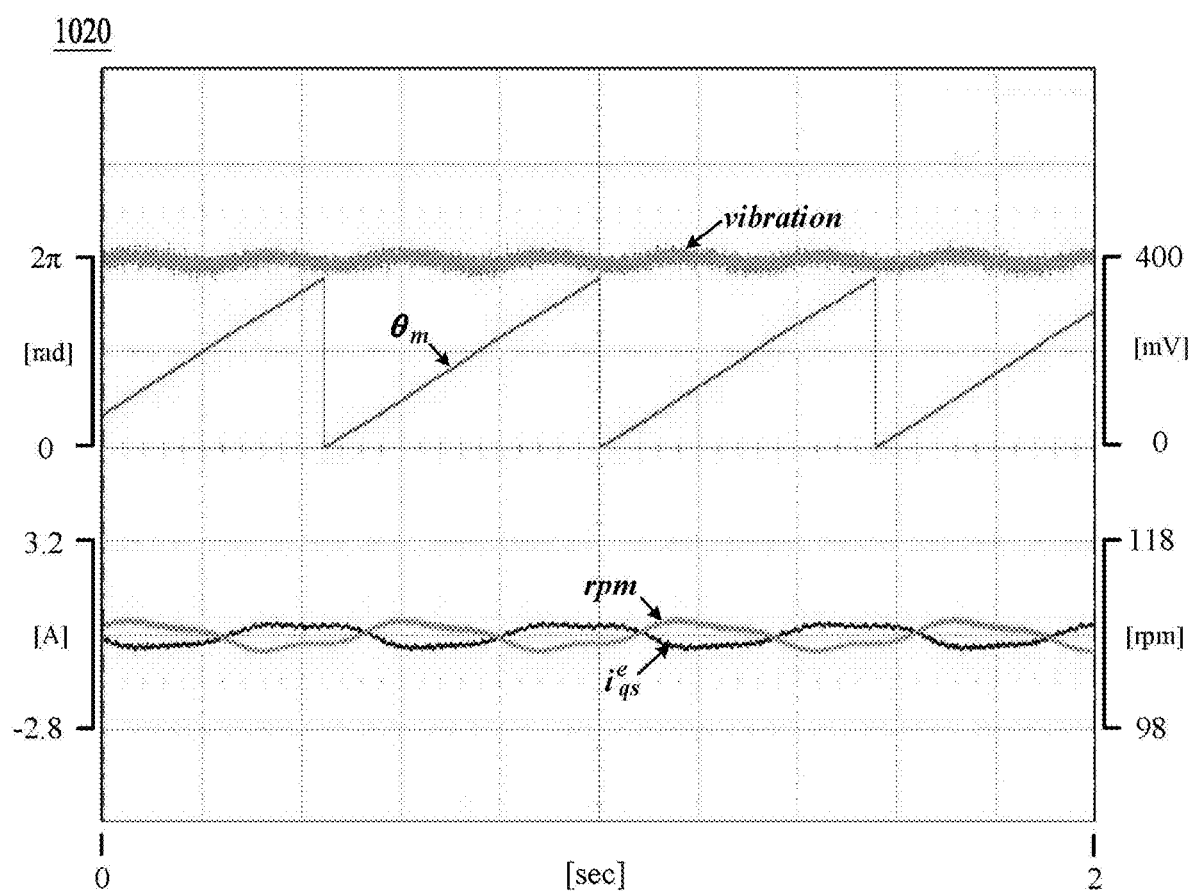
Figure 10C:
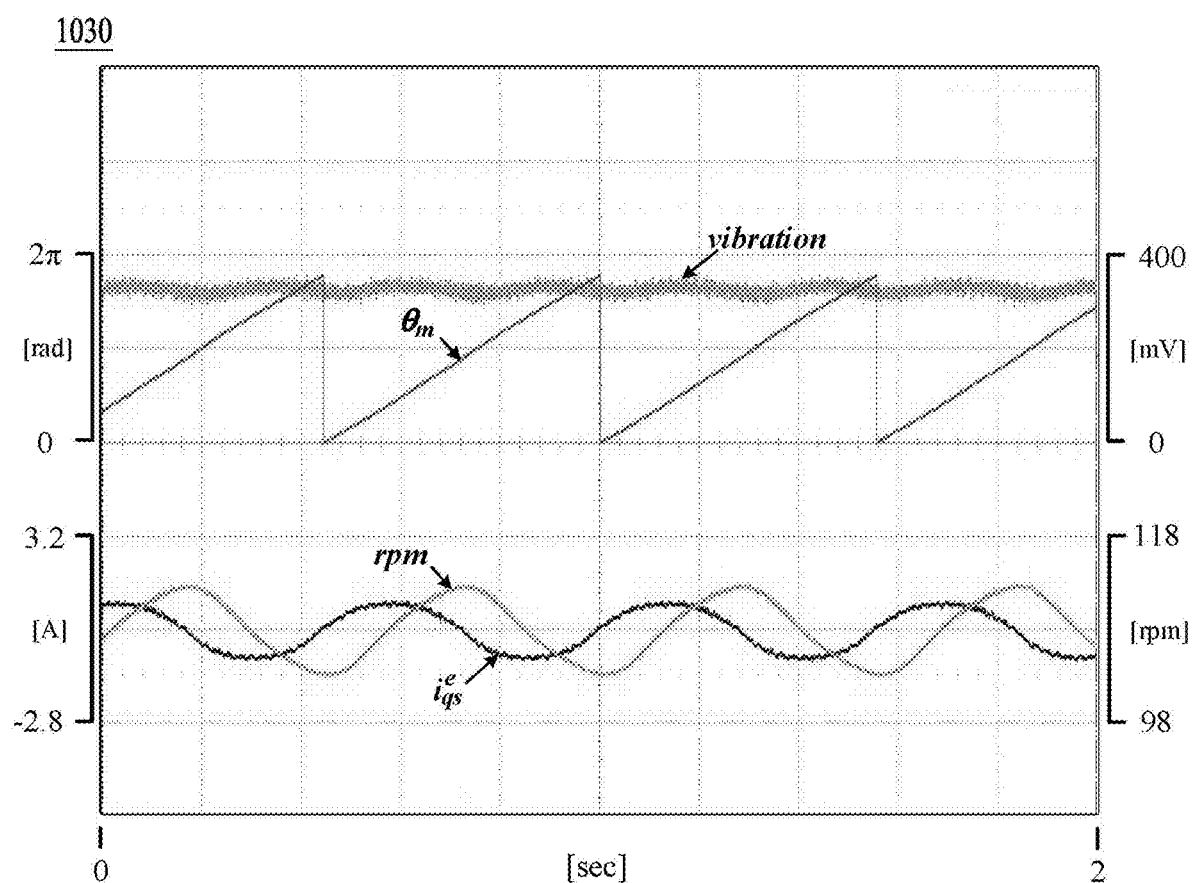

FIGS. 10A to 10C are diagrams illustrating a vibration value, a mechanical angle, a compensation angle, an instruction signal and a torque current at the time of motor control according to another example embodiment of the present disclosure. In an example embodiment, the load torque is set to 7 Kg, the driving speed is set to 108 RPM and the frequency of the mechanical angle is set to 1.78 Hz.

Referring to FIG. 10A, the motor is driven according to an example embodiment of the present disclosure, and the vibration value, the phase angle $θ_U$, the instruction current is, and the drive RPM associated with the drive of the motor are illustrated as indicated by reference numeral 1010.

In an example embodiment, the vibration value corresponds to the output voltage of the vibration sensor, which has a value close to 400 mV. The phase angle $θ_U$ may have a value of 0 to 2π. The drive RPM may vary in the range of 103 to 113 RPM in this example embodiment.

The compensation current for vibration reduction is generated and the phase angle $θ_U$ is changed starting from 0. Thereafter, the phase angle $θ_U$ may be adaptively changed according to a change in vibration. When an optimal value is obtained, the compensation current for vibration reduction is generated. In an example embodiment, the phase angle $θ_U$ may have a value of 0.525 rad, and thus a forward compensation torque current has a value of 1.5 A.

In an example embodiment, a state before the application of the compensation signal for vibration reduction is illustrated by reference numeral 1020 of FIG. 10B on an enlarged scale, and a state after the application of the compensation signal for vibration reduction is illustrated by reference numeral 1030 of FIG. 10O on an enlarged scale.

As illustrated by reference numeral 1020 of FIG. 10B, the vibration value, the mechanical angle, the instruction current $i^e_{qs}$, and the drive RPM are illustrated. The output value of the vibration sensor is higher than 400 mV, the mechanical angle $θ_m$ is changed in the range of 0 to 2π with reference to 1.78 Hz, the instruction current $i^e_{qs}$ is changed in the range of about 3 A, and the drive RPM is also changed in the range of about 108 RPM.

As illustrated by reference numeral 1030 of FIG. 10O, the vibration value, the mechanical angle $θ_m$, the instruction current $i^e_{qs}$, and the drive RPM are illustrated. The output value of the vibration sensor is lower than 400 mV, the mechanical angle $θ_m$ is changed in the range of 0 to 2π with reference to 1.78 Hz, the instruction current $i^e_{qs}$ is changed in the range of 2.96 A to 3.04 A with reference to 3 A, and the drive RPM is also changed in the range of 103 to 113 RPM with reference to of 108 RPM.

When the compensation current for vibration reduction is applied as described above, the vibration decreases, and the rotation RPM of the motor or the instruction current vary greatly. Furthermore, in an example embodiment, the vibration may decrease sequentially until the optimal phase angle $θ_U$ is applied, and thus the instruction current $i^e_{qs}$ and the maximum value and the minimum value of the drive RPM may also be adaptively changed.

However, the average drive RPM of the motor has a value corresponding to the driving speed. By operating in this way, the motor may be driven at a desired RPM even if the drive RPM of the motor is changed. Thus, the vibration can be reduced.

Figure 11A:
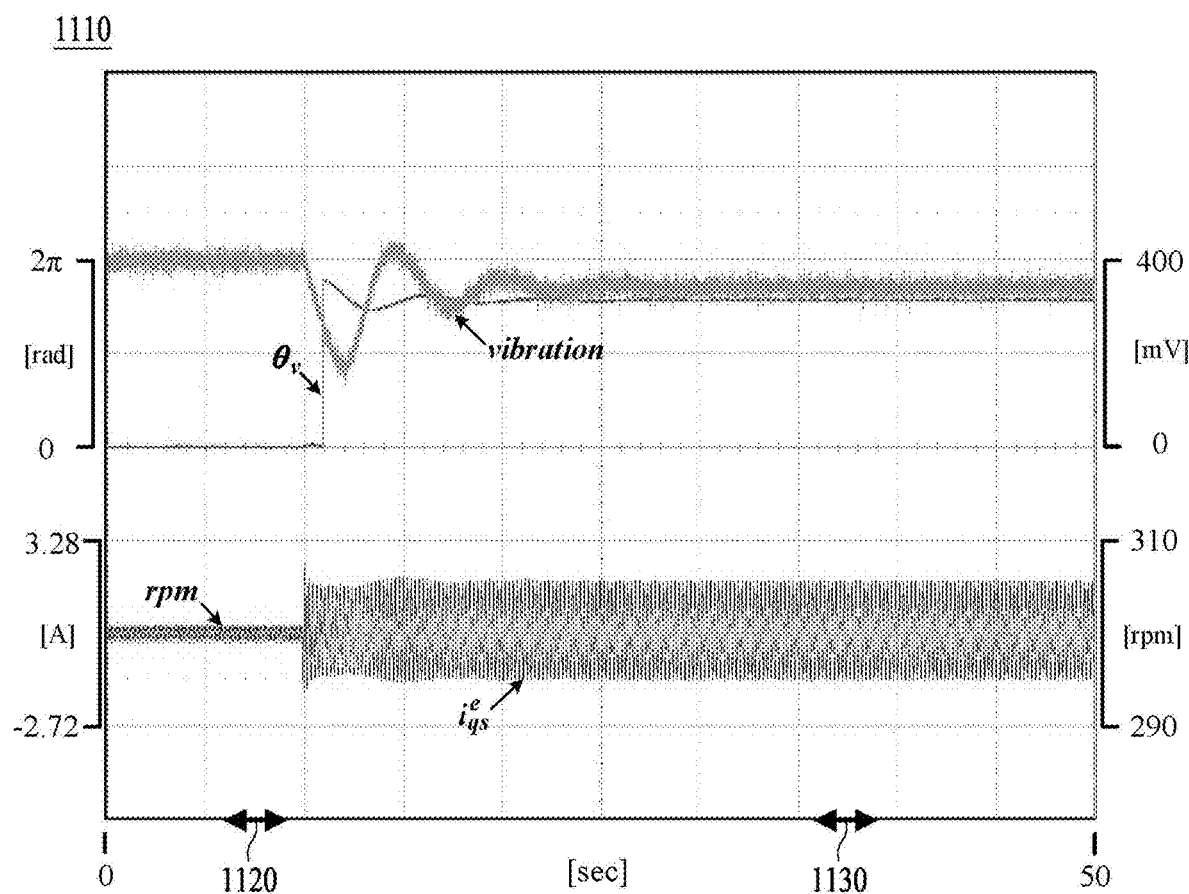
FIG. 11A to 11C are diagrams illustrating a vibration, a mechanical angle, a compensation angle, an instruction signal and a torque current at the time of motor control according to still another example embodiment of the present disclosure.
Figure 11B:
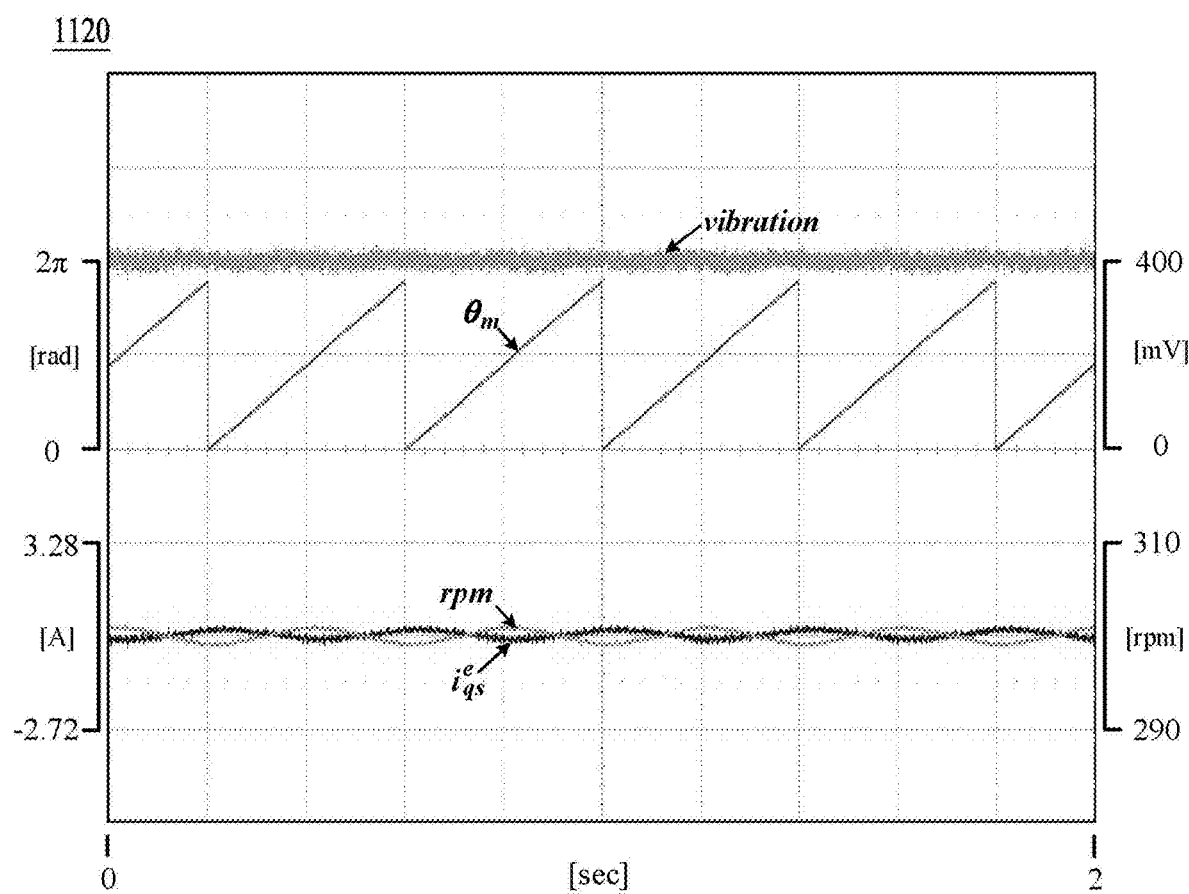
Figure 11C:
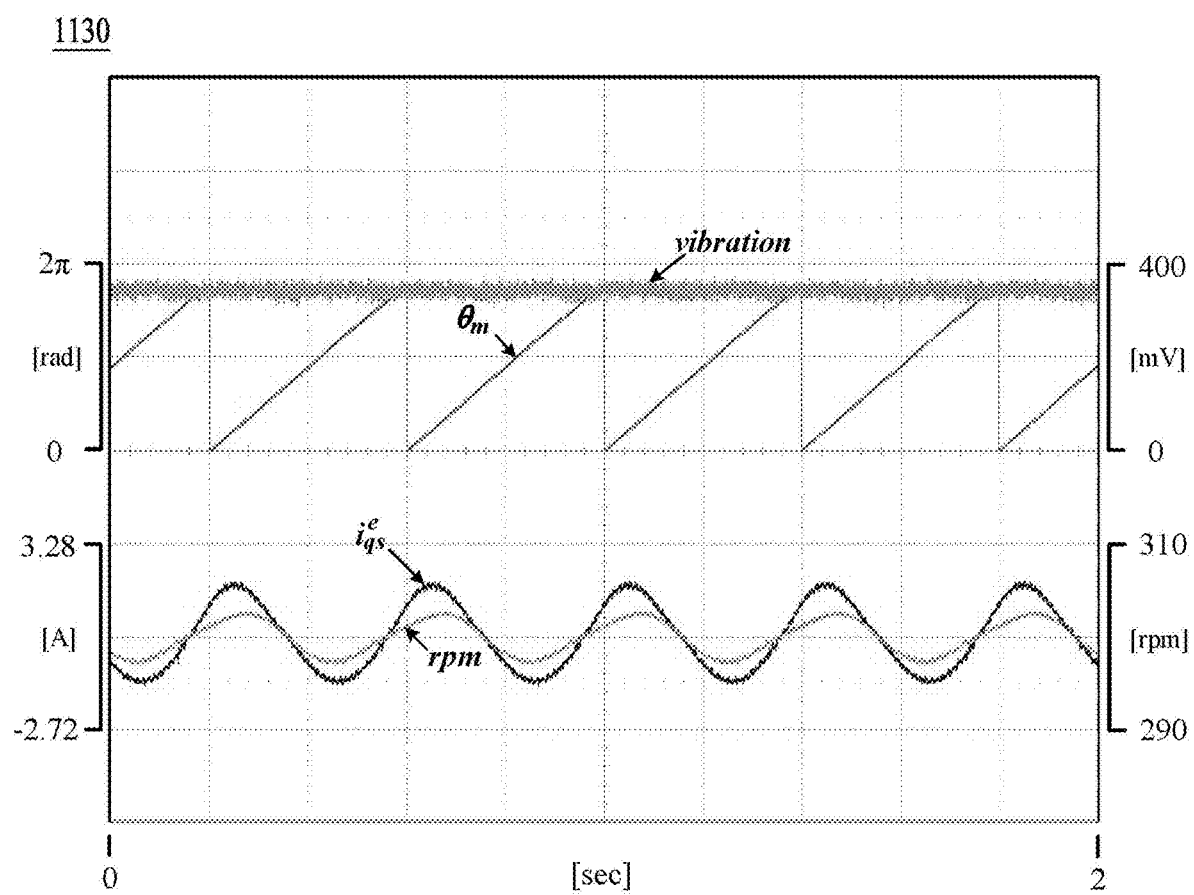

FIGS. 11A to 11C are diagrams illustrating a vibration value, a mechanical angle, a compensation angle, an instruction signal and a torque current at the time of motor control according to another example embodiment of the present disclosure. In an example embodiment, the load torque is set to 0 Kg, the driving speed is set to 300 RPM and the frequency of the mechanical angle is set to 4.9 Hz.

Referring to FIG. 11A, the motor is driven according to an example embodiment of the present disclosure, and the vibration value, the phase angle $θ_U$, the instruction current $i^e_{qs}$, and the drive RPM associated with the drive of the motor are illustrated as indicated by reference numeral 1110.

In an example embodiment, the vibration value corresponds to the output voltage of the vibration sensor, which has a value close to 400 mV. The phase angle $θ_U$ may have a value of 0 to 2π. The drive RPM may vary in the range of 296 to 304 RPM in this example embodiment.

The compensation current for vibration reduction is generated and the phase angle $θ_U$ is changed starting from 0. Thereafter, the phase angle $θ_U$ may be adaptively changed according to a change in vibration. When an optimal value is obtained, the compensation current for vibration reduction is generated. In an example embodiment, the phase angle $θ_U$ may have a value of 5.55 rad, and thus a forward compensation torque current has a value of 3.0 A.

In an example embodiment, a state before the application of the compensation signal for vibration reduction is illustrated by reference numeral 1120 of FIG. 11B on an enlarged scale, and a state after the application of the compensation signal for vibration reduction is illustrated by reference numeral 1130 of FIG. 11C on an enlarged scale.

As illustrated by reference numeral 1120 of FIG. 11B, the vibration value, the mechanical angle, the instruction current $i^e_{qs}$, and the drive RPM are illustrated. The output value of the vibration sensor has a value corresponding to 400 mV, the mechanical angle $\theta_m$ is changed in the range of 0 to $2\pi$ with reference to 4.94 Hz, the instruction current $i^e_{qs}$ is changed in the range of about 3 A, and the drive RPM is also changed in the range of about 300 RPM.

As illustrated by reference numeral 1130 of FIG. 11C, the vibration value, the mechanical angle $\theta_m$, the instruction current $i^e_{qs}$, and the drive RPM are illustrated. The output value of the vibration sensor is lower than 400 mV, the mechanical angle $\theta_m$ is changed in the range of 0 to $2\pi$ with reference to 4.94 Hz, the instruction current $i^e_{qs}$ is changed in the range of 2.86 A to 3.14 A with reference to 3 A, and the drive RPM is also changed in the range of 296 to 304 RPM with reference to of 300 RPM.

When the compensation current for vibration reduction is applied as described above, the vibration decreases, and the rotation RPM of the motor or the instruction current vary greatly. Furthermore, in an example embodiment, the vibration may decrease sequentially until the optimal phase angle $\theta_U$ is applied, and thus the instruction current $i^e_{qs}$ and the maximum value and the minimum value of the drive RPM may also be adaptively changed. Further, in an example embodiment, the vibration value may fluctuate at a certain level with a change in the phase angle $\theta_U$ of the compensation current.

However, the average drive RPM of the motor has a value corresponding to the driving speed. By operating in this way, the motor may be driven at a desired RPM even if the drive RPM of the motor is changed. Thus, the vibration can be reduced.

Figure 12A:
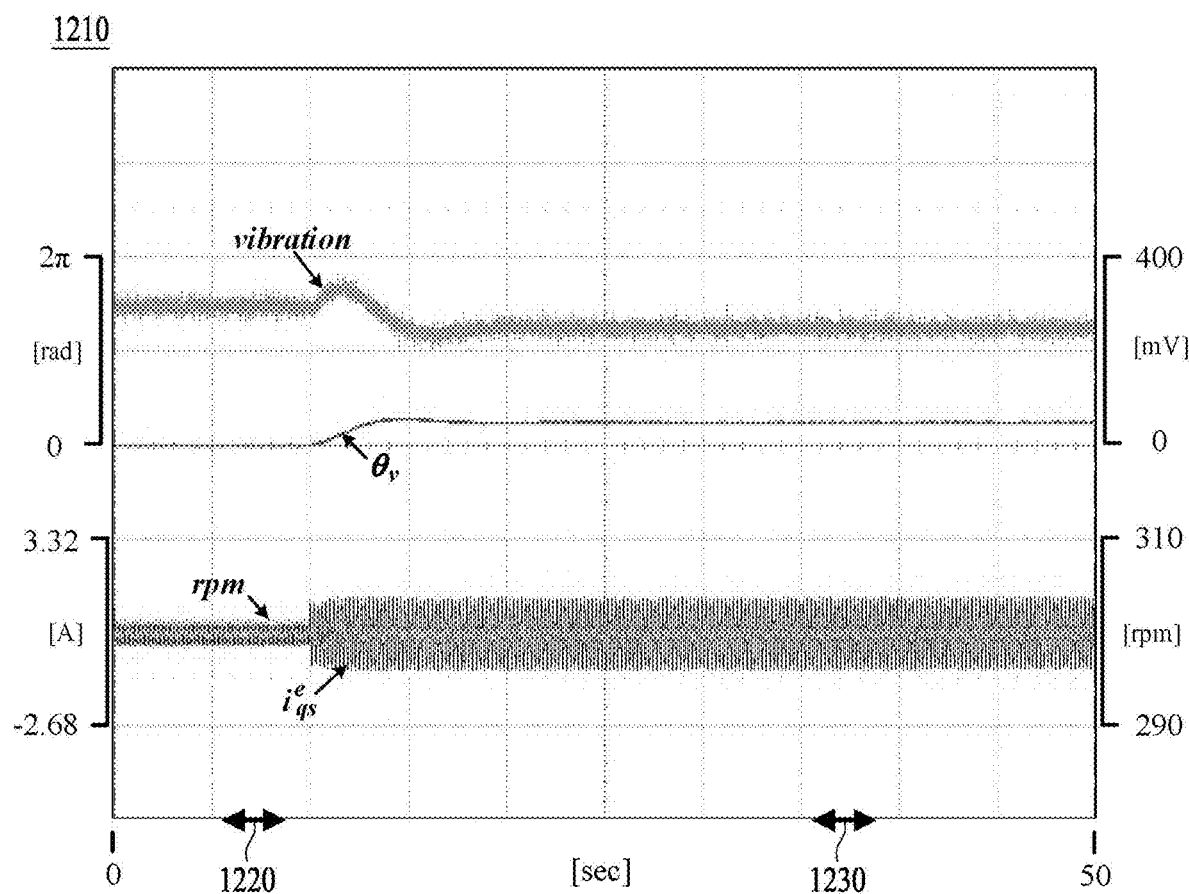
FIGS. 12A to 12C are diagrams illustrating a vibration, a mechanical angle, a compensation angle, an instruction signal and a torque current at the time of motor control according to yet another example embodiment of the present disclosure.
Figure 12B:
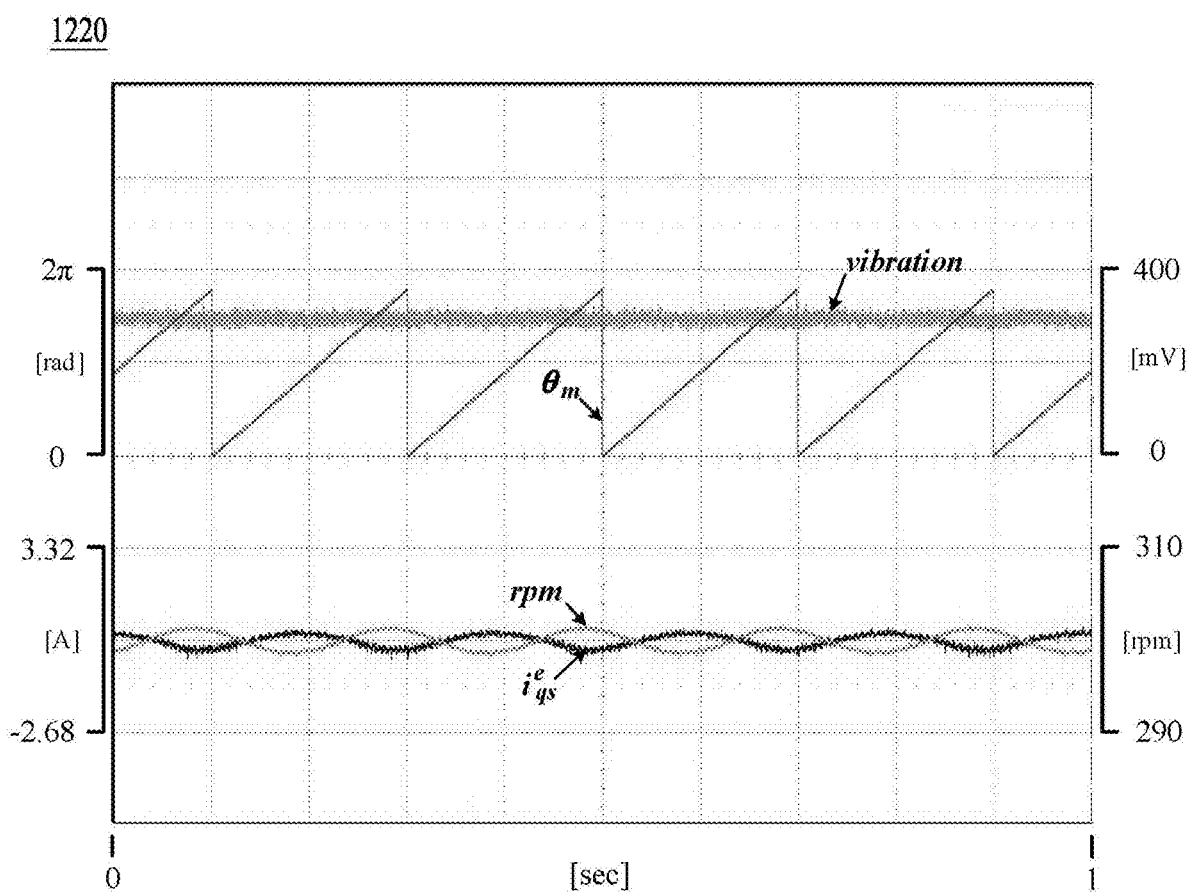
Figure 12C:
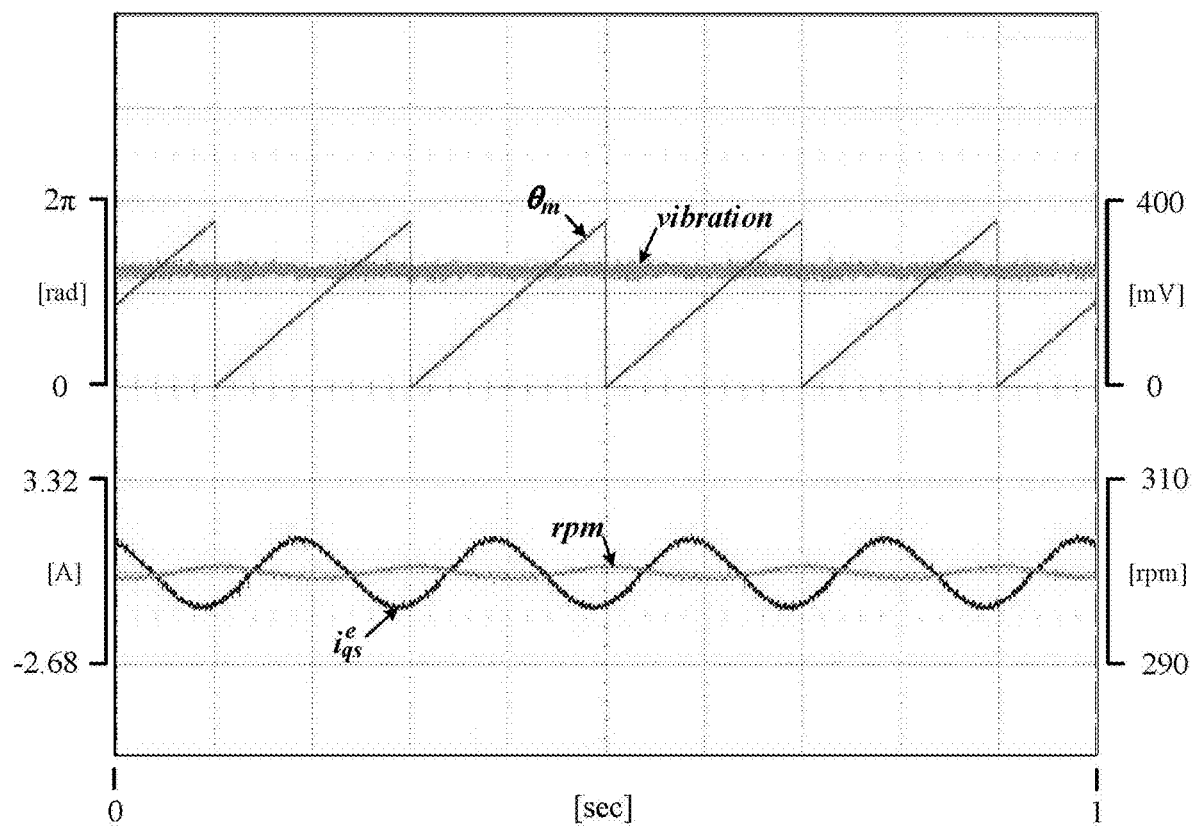

FIGS. 12A to 12C are diagrams illustrating a vibration value, a mechanical angle, a compensation angle, an instruction signal and a torque current at the time of motor control according to another example embodiment of the present disclosure. In an example embodiment, the load torque is set to 7 Kg, the driving speed is set to 300 RPM and the frequency of the mechanical angle is set to 4.94 Hz.

Referring to FIG. 12A, the motor is driven according to an example embodiment of the present disclosure, and the vibration value, the phase angle $\theta_U$, the instruction current $i^e_{qs}$, and the drive RPM associated with the drive of the motor are illustrated as indicated by reference numeral 1210.

In an example embodiment, the vibration value corresponds to the output voltage of the vibration sensor, which has a value close to 300 mV. The phase angle $\theta_U$ may have a value of 0 to $2\pi$. The drive RPM may vary in the range of 298 to 302 RPM in this example embodiment.

The compensation current for vibration reduction is generated and the phase angle $\theta_U$ is changed starting from 0. Thereafter, the phase angle $\theta_U$ may be adaptively changed according to a change in vibration. When an optimal value is obtained, the compensation current for vibration reduction is generated. In an example embodiment, the phase angle $\theta_U$ may have a value of 0.73 rad, and thus a forward compensation torque current has a value of 1.5 A.

In an example embodiment, a state before the application of the compensation signal for vibration reduction is illustrated by reference numeral 1220 of FIG. 12B on an enlarged scale, and a state after the application of the compensation signal for vibration reduction is illustrated by reference numeral 1230 of FIG. 12C on an enlarged scale.

As illustrated by reference numeral 1220 of FIG. 12B, the vibration value, the mechanical angle, the instruction current $i^e_{qs}$, and the drive RPM are illustrated. The output value of the vibration sensor has a value corresponding to 300 mV, the mechanical angle $\theta_m$ is changed in the range of 0 to $2\pi$ with reference to 4.94 Hz, the instruction current $i^e_{qs}$ is changed in the range of about 3 A, and the drive RPM is also changed in the range of about 300 RPM.

As illustrated by reference numeral 1230 of FIG. 12C, the vibration value, the mechanical angle $\theta_m$, the instruction current $i^e_{qs}$, and the drive RPM are illustrated. The output value of the vibration sensor is lower than 300 mV, the mechanical angle $\theta_m$ is changed in the range of 0 to $2\pi$ with reference to 4.94 Hz, the instruction current $i^e_{qs}$ is changed in the range of 2.92 A to 3.08 A with reference to 3 A, and the drive RPM is also changed in the range of 298 to 302 RPM with reference to of 300 RPM.

When the compensation current for vibration reduction is applied as described above, the vibration decreases, and the rotation RPM of the motor or the instruction current vary greatly. Furthermore, in an example embodiment, the vibration may decrease sequentially until the optimal phase angle $\theta_U$ is applied, and thus the instruction current $i^e_{qs}$ and the maximum value and the minimum value of the drive RPM may also be adaptively changed. Further, in an example embodiment, the vibration value may fluctuate at a certain level with a change in the phase angle $\theta_U$ of the compensation current.

However, the average drive RPM of the motor has a value corresponding to the driving speed. By operating in this way, the motor may be driven at a desired RPM even if the drive RPM of the motor is changed. Thus, the vibration can be reduced.

Further, in an example embodiment, the phase angles $\theta_U$ may different for each motor driving speed under the same motor drive environment and vibration attenuation condition, and the vibration patterns may also different in the course of adaptively changing the phase angle $\theta_U$ so as to converge to a value adapted for the vibration attenuation condition.

Figure 13:
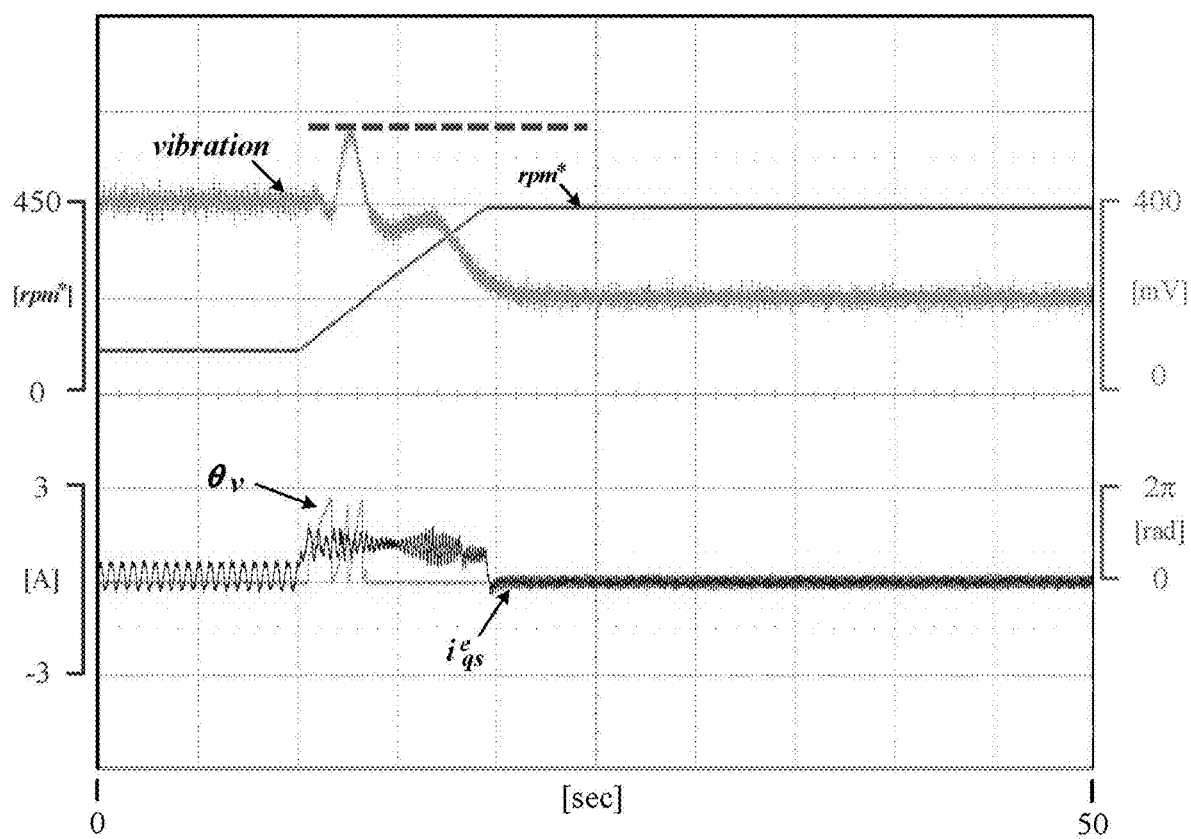
FIG. 13 is a diagram illustrating a vibration, a drive RPM (revolutions per minute), a compensation angle, and a torque current when no compensation signal is applied according to an example embodiment of the present disclosure.

FIG. 13 is a diagram illustrating a vibration value, a drive RPM, a compensation angle, and a torque current when no compensation signal is applied according to an example embodiment of the present disclosure.

Referring to FIG. 13, the drive RPM may vary from 108 RPM to 450 RPM, and patterns of changes in the vibration value and the instruction current $i^e_{qs}$ are illustrated as indicated by reference numeral 1310. In an example embodiment, the controller may control the motor in a sequential manner in a low-speed maintenance section, an acceleration section, and a high-speed maintenance section. The rotation RPM in the low-speed maintenance section is 108, and the rotation RPM in the high-speed maintenance section is 450. The rotation RPM may gradually increase in the acceleration section.

Although in the above example embodiment, the phase angle $\theta_U$ of the compensation current has been described to be detected according to the vibration pattern, the compensation signal may not be applied to the motor control. Further, in an example embodiment, when the degree of vibration decreases to a certain value or less, the phase angle $\theta_U$ may not be detected. Further, in an example embodiment, the drive RPM may be determined based on the number of rotations per unit time. Even though the drive RPM fluctuates momentarily in a short time, when the RPM per unit time is kept constant, the respective RPM may be defined as the average RPM. Such a drive RPM may represent a moving average value over time.

The maximum value of the vibration is indicated by a dotted line. The maximum value of the vibration is detected in a portion of a section in which the RPM increases. Thereafter, the vibration may be stabilized when the drive RPM reaches 450.

Figure 14:
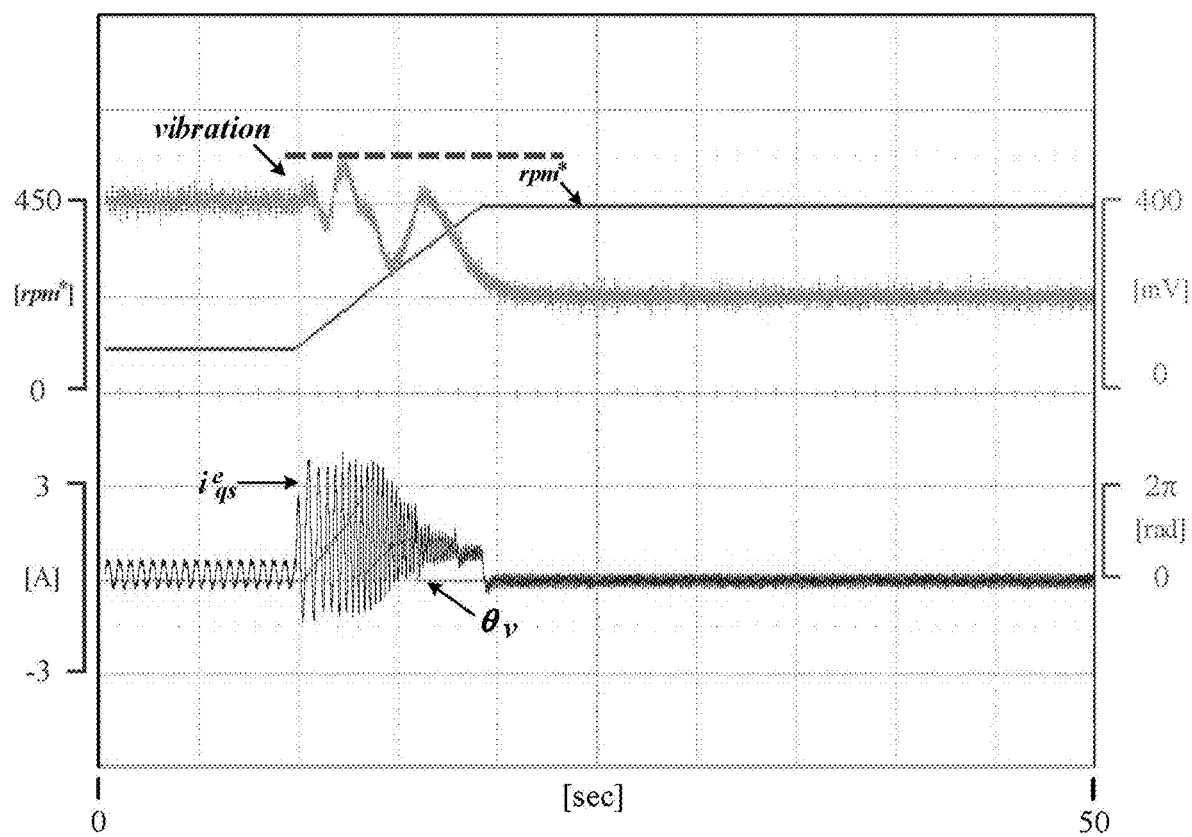
FIG. 14 is a diagram illustrating a vibration, a drive RPM, a compensation angle, and a torque current when a first type of compensation signal is applied according to an example embodiment of the present disclosure.

FIG. 14 is a diagram illustrating a vibration value, a drive RPM, a compensation angle, and a torque current when a first type of compensation signal is applied according to an example embodiment of the present disclosure.

Referring to FIG. 14, patterns of changes in the vibration value, the phase angle $\theta_U$ of the compensation current, and the instruction current $i^e_{qs}$ according to a change in the drive RPM when the first type of compensation signal is applied under the driving environment as illustrated in FIG. 13, are illustrated as indicated by reference numeral 1410. In an example embodiment, the RPM may be changed from 108 RPM up to 450 RPM, the forward compensation torque current may be 2 A, and the vibration attenuation rate $K_\delta$ may be 0.7. Further, the first type of compensation signal may be applied when the RPM increases from 108 RPM, and may not be applied at 350 RPM or higher. As described above, the compensation signal is applied when the RPM increases from 108 RPM and is not applied when the RPM is equal to or higher than a specific RPM. That is, the compensation signal may be applied in a section with high vibration to reduce the vibration. Through a control in the instruction signal is used in a section with less vibration, the motor can be driven up to a desired RPM.

Figure 15:
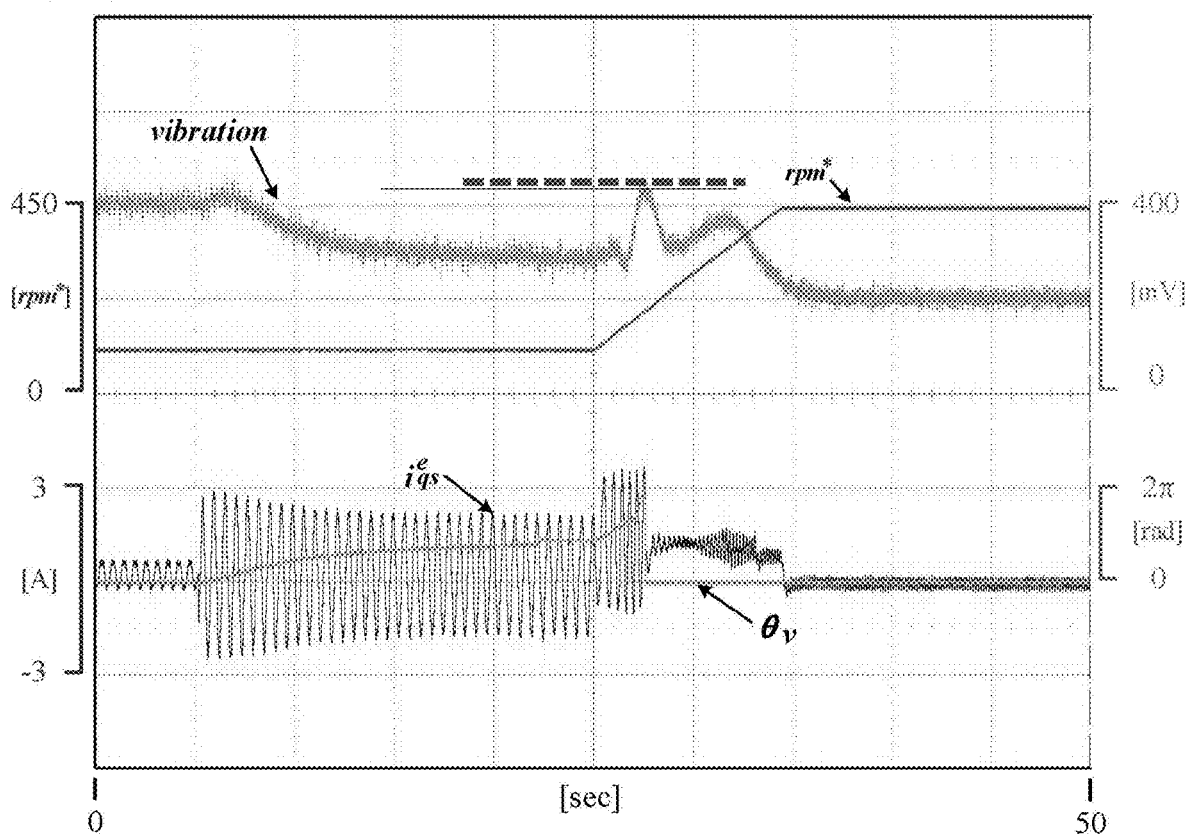
FIG. 15 is a diagram illustrating a vibration, a drive RPM, a compensation angle and a torque current when a second type of compensation signal is applied according to an example embodiment of the present disclosure.

FIG. 15 is a diagram illustrating a vibration value, a drive RPM, a compensation angle, and a torque current when a second type of compensation signal is applied according to an example embodiment of the present disclosure.

Referring to FIG. 15, patterns of changes in the vibration value, the phase angle $\theta_U$ of the compensation current, and the instruction current $i^e_{qs}$ according to a change in the drive RPM when the second type of compensation signal is applied under the driving environment as illustrated in FIG. 13, are illustrated as indicated by reference numeral 1510. In an example embodiment, the RPM may be changed from 108 RPM to 450 RPM, the forward compensation torque current may be 2 A, and the vibration attenuation rate $K_\delta$ may be 0.7. Further, in the method disclosed herein, the second type of compensation signal may be applied during a certain period of time at 108 RPM to stabilize the vibration, and thus the compensation signal may be adaptively changed while increasing the RPM after the phase angle $\theta_U$ converges to a specific value. More specifically, when the RPM is 108, the compensation signal may be applied to reduce the vibration, and when the RPM increases and reaches a specific RPM, no complementary signal may be applied. In an example embodiment, the specific RPM is 200 RPM. In the case in which the drive RPM of the motor needs to be increased after being kept constant in a specific section, the controller may apply the compensation signal in the section, in which the drive RPM is kept constant, to reduce the vibration, and may increase the RPM after the phase angle $\theta_U$ converges to the specific valve. The controller does not apply the compensation signal in a section other than the specific section. As described above, by applying the compensation signal in advance in the section in which the RPM is kept constant before being increased, it is possible to quickly derive the phase angle $\theta_U$ which is capable of implementing the vibration reduction regardless of the change in RPM, and also to lower the maximum vibration value. RPM at which the compensation signal is not applied, may be set differently in some cases. As an example, the compensation signal may not be applied at RPMs corresponding to 200% to 330% of the minimum RPM in a section in which RPM changes.

As such, it can be seen that the maximum vibration value as indicated by the dotted line gradually decreases by applying the first type of compensation signal and the second type of compensation signal.

Although the washing machine has been described by way of an example in the above example embodiments, the example embodiments of the present disclosure are widely applicable to home appliances equipped with a motor. As an example, in a home appliance in which vibration may occur when the motor is driven, the present disclosure is applicable to a case of generating a control signal for reducing motor's vibration based on information acquired by a vibration sensor. Further, the vibration sensor is not particularly limited, but may include an acceleration sensor. The example embodiments of the present disclosure are applicable regardless of the type of vibration sensor.

Further, although in the present disclosure, desirable example embodiments of the present disclosure have been described with reference to the figures and the specific terms have been used, they are merely specific examples disclosed to easily explain the technical content of the present disclosure and further facilitate overall understanding of the present disclosure, and are not intended to limit the scope of the present disclosure. Further, it will be apparent to those skilled in the art that other variations based on the technical ideas of the present disclosure may be made in addition to the example embodiments disclosed herein.

What is claimed is:

1. A motor driving apparatus comprising:
   an inverter that includes at least one switching element and that is configured to output alternating current power to a motor;
   a vibration sensor configured to detect vibrations; and
   a controller (i) comprising a compensation signal generator that is configured to, based on an output value of the vibration sensor, generate a compensation signal and (ii) configured to generate a control signal for controlling the inverter,
   wherein the compensation signal includes a sinusoidal signal generated based on a phase angle component corresponding to the output value of the vibration sensor and a mechanical angle component of the motor.

2. The motor driving apparatus of claim 1, wherein the controller is configured to, based on the output value of the vibration sensor being equal to or greater than a reference vibration value, generate the control signal including the compensation signal.

3. The motor driving apparatus of claim 1, wherein the phase angle component is identified based on an integral gain or an integral and integral proportional gain according to the output value of the vibration sensor.

4. The motor driving apparatus of claim 1, wherein the controller is configured to control the motor to operate in a low-speed maintenance section, an acceleration section, and a high-speed maintenance section, sequentially, and
   wherein the controller is configured to generate the control signal including the compensation signal in at least a portion of the acceleration section.

5. The motor driving apparatus of claim 1, wherein the compensation signal includes a forward compensation current component, and
   wherein the phase angle component converges to a specific value based on the controller maintaining a rotational speed of the motor.

6. The motor driving apparatus of claim 4, wherein the controller is configured to generate the control signal including the compensation signal from a start of the acceleration section until a rotational speed of the motor reaches a first reference revolutions per minute (RPM).

7. The motor driving apparatus of claim 4, wherein the controller is configured to, based on the motor being controlled by the control signal including the compensation signal generated in the low-speed maintenance section, increase an amplitude of a current associated with an operation of the motor.

8. The motor driving apparatus of claim 6, wherein the controller is configured to, based on the rotational speed of the motor being greater than the first reference RPM, generate a control signal excluding the compensation signal.

9. The motor driving apparatus of claim 6, wherein the controller is configured to:
generate the control signal including the compensation signal in at least a portion of the low-speed maintenance section and from a start of the acceleration section until the rotational speed of the motor reaches a second reference RPM, and
generate, based on the rotational speed of the motor being greater than the second reference RPM, a control signal excluding the compensation signal.

10. A method of controlling a motor having an inverter, the method comprising:
controlling the inverter to operate the motor;
identifying, based on the motor operating, an output value of a vibration sensor;
generating a compensation signal based on the output value of the vibration sensor; and
generating a control signal that controls the inverter,
wherein the compensation signal includes a sinusoidal signal generated based on a phase angle component corresponding to the output value of the vibration sensor and a mechanical angle component of the motor.

11. The method of claim 10, wherein generating the control signal comprises generating, based on the output value of the vibration sensor being equal to or greater than a reference vibration value, the control signal including the compensation signal.

12. The method of claim 10, wherein the phase angle component is identified based on an integral gain or an integral and integral proportional gain according to an output of the vibration sensor.

13. The method of claim 10, further comprising:
controlling the motor to operate in a low-speed maintenance section, an acceleration section, and a high-speed maintenance section, sequentially,
wherein the control signal that includes the compensation signal is generated in at least a portion of the acceleration section.

14. The method of claim 10, wherein the compensation signal includes a forward compensation current component, and
wherein the phase angle component converges to a specific value based on a rotational speed of the motor being maintained.

15. The method of claim 13, wherein generating the control signal comprises generating the control signal including the compensation signal from a start of the acceleration section until a rotational speed of the motor reaches a first reference revolutions per minute (RPM).

16. The method of claim 13, wherein an amplitude of a current associated with an operation of the motor is increased based on the motor being controlled by the control signal that includes the compensation signal generated in the low-speed maintenance section.

17. The method of claim 15, wherein generating the control signal comprises generating, based on the rotational speed of the motor being greater than the first reference RPM, a control signal excluding the compensation signal.

18. The method of claim 15, wherein generating the control signal comprises:
generating the control signal that includes the compensation signal in at least a portion of the low-speed maintenance section and from a start of the acceleration section until the rotational speed of the motor reaches a second reference RPM, and
generating, based on the rotational speed of the motor being greater than the second reference RPM, a control signal excluding the compensation signal.

* * * * *